(12) United States Patent
Kwon et al.

(10) Patent No.: US 9,453,687 B2
(45) Date of Patent: Sep. 27, 2016

(54) PLUME ABATEMENT AND EVAPORATED WATER RECOVERY APPARATUS USING COMBINED HEAT EXCHANGER-CONDENSER

(71) Applicants: Daeil Aqua Co., Ltd., Gimhae-si, Gyeonsangnam-do (KR); Oick Kwon, Gwangmyeong-si, Gyeonggi-do (KR)

(72) Inventors: Oick Kwon, Gwangmyeong-si (KR); Young-wook Kim, Busan-si (KR); Young-hwa Cho, Busan-si (KR)

(73) Assignees: Daeil Aqua Co., Ltd., Gyeongsangnam-Do (KR); Oick Kwon, Gyeonggi-Do (KR)

( * ) Notice: Subject to any disclaimer, the term of this patent is extended or adjusted under 35 U.S.C. 154(b) by 528 days.

(21) Appl. No.: 13/797,892

(22) Filed: Mar. 12, 2013

(65) Prior Publication Data
US 2014/0008040 A1    Jan. 9, 2014

(51) Int. Cl.
| | |
|---|---|
| *B01F 3/04* | (2006.01) |
| *F28D 15/02* | (2006.01) |
| *F28F 25/02* | (2006.01) |
| *F28B 1/06* | (2006.01) |

(Continued)

(52) U.S. Cl.
CPC ............... *F28D 15/02* (2013.01); *F28B 1/06* (2013.01); *F28C 1/14* (2013.01); *F28D 9/0037* (2013.01); *F28D 9/0093* (2013.01); *F28F 25/02* (2013.01); *F28F 2275/14* (2013.01)

(58) Field of Classification Search
CPC .......... F28B 1/06; F28C 1/14; F28D 9/0037; F28D 9/0093; F28D 15/02; F28F 25/02; F28F 2275/14
USPC ....... 261/146, 147, 148, 150, 152, 155, 156, 261/158, 159, 160, 161, 108
See application file for complete search history.

(56) References Cited

U.S. PATENT DOCUMENTS 3,995,689 A * 12/1976 Cates .................... F28B 1/06
165/166
4,076,771 A * 2/1978 Houx, Jr. ............. F28F 25/12
165/900

(Continued)

FOREIGN PATENT DOCUMENTS

| KR | 10-0784802 B1 | 12/2007 |
|---|---|---|
| KR | 10-2011-0047622 A | 5/2011 |

(Continued)

OTHER PUBLICATIONS

Korean Office Action for Patent Application No. 2012-0095638 dated Dec. 24, 2013, 4 pages.

*Primary Examiner* — Charles Bushey
(74) *Attorney, Agent, or Firm* — Haynes & Boone, LLP

(57) ABSTRACT

A heat exchange-condensation panel assembly includes a plurality of moisture air flow passages (113), a plurality of cooling water flow passages (123) and a plurality of condensing air flow passages (133), wherein the moisture air flow passage (113) is arranged adjacently to the condensing air flow passage (133) so that the moisture air passing through the moisture air flow passage is condensed by the condensing air passing through the condensing air flow passage, and the cooling water flow passage (123) is arranged adjacently to the condensing air flow passage (133) so that the cooling water passing through the cooling water flow passage is cooled by the condensing air passing through the condensing air flow passage.

17 Claims, 24 Drawing Sheets

(51) Int. Cl.
*F28C 1/14* (2006.01)
*F28D 9/00* (2006.01)

(56) References Cited

U.S. PATENT DOCUMENTS

| | | | | |
|---|---|---|---|---|
| 4,119,140 A | * | 10/1978 | Cates | F28B 1/06 165/115 |
| 5,800,743 A | * | 9/1998 | Usui | F28C 1/14 261/112.1 |
| 6,247,682 B1 | * | 6/2001 | Vouche | F28C 1/14 165/900 |
| 6,663,087 B2 | * | 12/2003 | Hubbard | F28C 1/14 165/166 |
| 6,663,694 B2 | * | 12/2003 | Hubbard | F28C 1/14 165/157 |
| 7,128,310 B2 | * | 10/2006 | Mockry | F28C 1/14 165/165 |
| 7,328,886 B2 | * | 2/2008 | Mockry | F28C 1/14 165/165 |

FOREIGN PATENT DOCUMENTS

| | | |
|---|---|---|
| KR | 10-1200330 B | 11/2012 |
| KR | 10-1204758 B | 11/2012 |

* cited by examiner

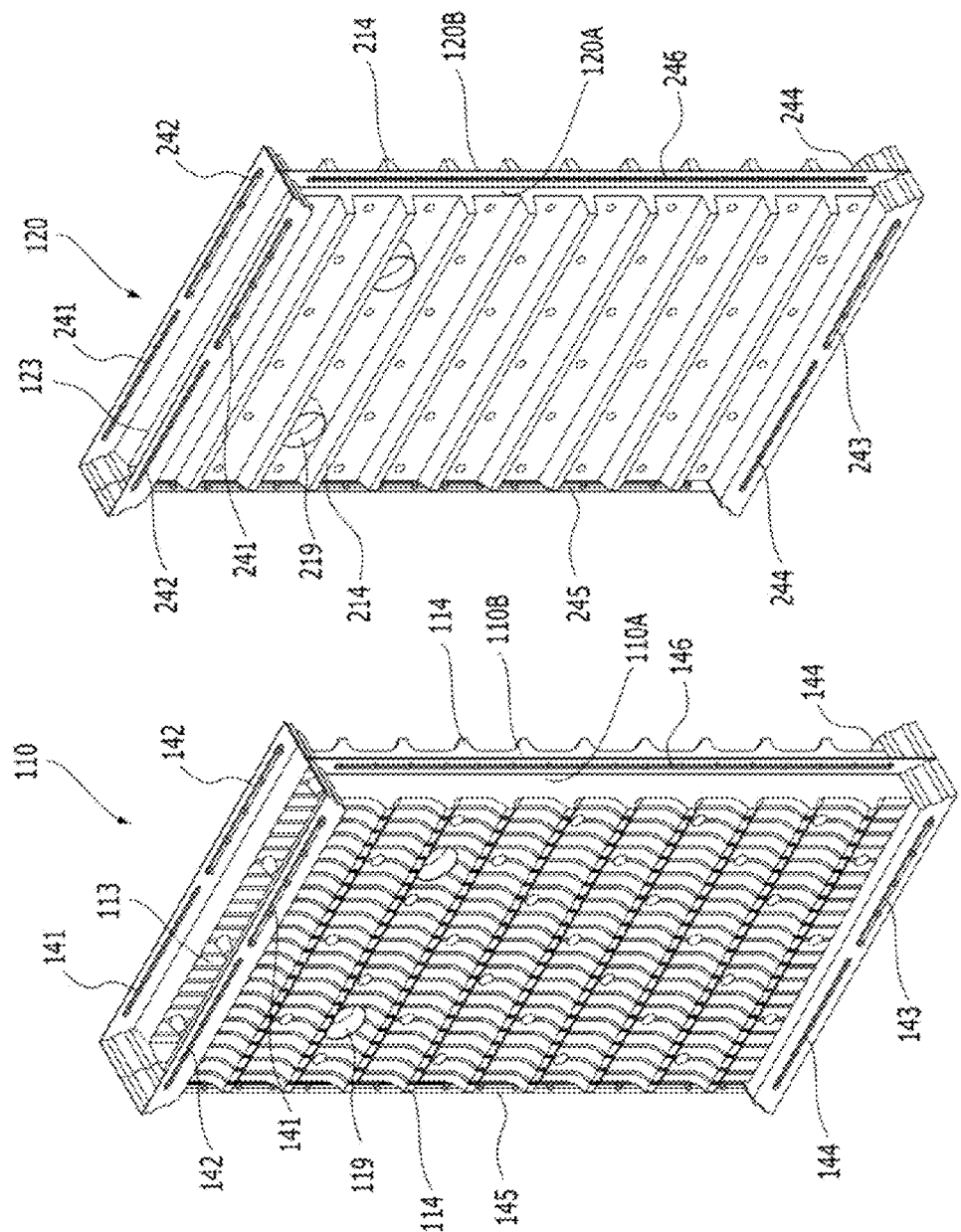

PLUME ABATEMENT AND EVAPORATED WATER RECOVERY APPARATUS USING COMBINED HEAT EXCHANGER-CONDENSER

RELATED APPLICATIONS

This application claims under 35 U.S.C. §119(a) the benefit of Korean Patent Application No. 2012-0074562, filed on Jul. 9, 2012, and Korean Patent Application No. 2012-0095638, filed on Aug. 30, 2012, both of which are herein incorporated by reference in their entirety.

BACKGROUND

1. Technical Field

The present invention relates to a cooling water heat exchange-evaporated water recovery panel assembly (Hereinafter, referred to as "heat exchange-condensation panel assembly"), capable of reducing a plume generated in a cooling tower and recovering a water from the evaporated water vapor. In particular, the present invention relates to a heat exchange-condensation panel assembly provided with a saturated air flow passage, a cooling water flow passage and a condensing air flow passage for improving the plume abatement and water recovery efficiency.

Further, the present invention relates to a cooling water distribution device which sprays the hot cooling water onto the top of above mentioned heat exchange-condensation panel assembly to increase the plume abatement performance and to remove the heat from the cooling water.

2. Discussion of Related Arts

In general, the water is used for cooling the heat which is generated in various processes of industrial plants. The water vapor evaporated during removing the heats with the direct air-water contact is discharged to the atmosphere through a cooling tower thereby wasting a large amount of water resources.

The heat removed from the cooling water is transferred to the air induced into the cooling tower. Thus, the temperature of air discharged from the cooling tower is higher than one of ambient air and the state of air is near to the saturation which contains more water than the water content of ambient air. When air in this state is discharged into the atmosphere at a relatively low temperature, the temperature of air is lowered below to the dew point during being mixed with the cold ambient air. The water vapor exceeding the maximum content of water vapor at a dew point is changed to the water droplet like white smoke. It consists of pure water droplets and is not harmful. However, it looks as an air pollutant discharged through a chimney of plant. Nevertheless, it causes inconvenience due to the fall of water droplets to the surrounding ground of the cooling tower or the water droplet fallen onto the ground is frozen in the winter season and can cause human injury.

As a result, there have been efforts for recovering a water vapor and reducing the plume formation by using a condenser on a discharging passage of an air containing water vapor.

In an apparatus for abating the plume formation disclosed in Korean Patent No. 1,200,330, a condenser is provided in such a manner that a plurality of moisture air flow passages through which the air containing water vapor (hereinafter, referred to as "moisture air") passes and a plurality of condensing air flow passages through which the atmospheric air (condensing air) passes are arranged alternatively and adjacently in a vertical flow direction of the moisture air and a flow direction of the condensing air (see FIG. 3 in Korean Patent No. 1,200,330). In the condenser as described above, the heat of high temperature-humidity air passing through the moisture air flow passage is transferred to the air passing through the condensing air flow passage through wall surfaces of the respective panel assemblies constituting the condenser and thus the moisture air is cooled by the condensing air to condense the water vapor contained in the moisture air.

The air passing through the condensing air flow passage is not evenly flowing onto the surface of condenser assembly and is usually upward to them due to the strong suction force of a fan. Therefore, a dead zone where a heat is not transferred sufficiently may be formed at a lower region of the respective condensing air flow passages.

In order to solve the above drawbacks, in Korean Patent No. 1,204,758, as shown in FIG. 1, a condenser 10 is provided in such a manner that the conduits 4 constituting a plurality of condensing air flow passages 3, each of which is partitioned, are arranged in parallel on the respective panel assemblies 1, 2 so that a heat exchange area between the moisture air and the condensing air is increased. Further, a flow direction of the condensing air introduced from outside is biased upwardly due to suction force of the fan 35 while it passes through the inside of the condenser 10 and thus a region (dead zone) where the heat is not exchanged sufficiently is not formed at a lower part of the condenser, and further heat exchange through the whole condenser 10 is accelerated equally so that the water vapor passing through the moisture air flow passage 5 is condensed efficiently.

However, in the conventional cooling tower, the entire amount of cooling water is cooled only through the filler and thus it causes much evaporation of the cooling water, and even though an eliminator is arranged over a cooling water distribution means in order to eliminate fine water drops discharged into the atmosphere, there is a limitation to reduce fine water drops discharged into the atmosphere thereby causing an unsatisfactory plume abatement and insufficient evaporated water recovery.

Furthermore, in the conventional cooling tower, the moisture air that passes through the moisture air flow passage is biased to an edge of a fan stack ("B" region in FIG. 2) due to suction force of the fan 35 and thus the moisture air is not mixed completely with the atmospheric air that passes through the condensing air flow passage and is discharged to an upper and middle part of the cooling tower 30 ("A" region in FIG. 2) thereby not abating the plume efficiently.

In addition, since an injection angle of the cooling water sprayed from injection nozzles 42 of the cooling water distribution arranged in upper parts of heat exchange-condensation panel assemblies 100, 120 (a cooling water flow passage panel assembly 120 is only shown in FIG. 14) is limited to a predetermined angle, a dead zone where the cooling water is not sprayed is formed between the injection nozzles 42 and thus heat exchange efficiency is reduced between the cooling water and the condensing air (the atmospheric air) and between the cooling water and the moisture air in the heat exchange-condensation panel assemblies. In this case, even though it is possible to minimize the area of the dead zone by narrowing the space between the injection nozzles 42 and installing additional injection nozzles 42 to the cooling water distribution means, it is not practical and would increase cost and cause complexity of a device due to the increment of the number of the injection nozzles 42 to be installed.

SUMMARY OF THE DISCLOSURE

The present invention has been proposed to solve the above problems, one object of the present invention is to provide an apparatus and a method using the apparatus in which the condensing air flow passages are arranged on both sides of the moisture air flow passage and also on both sides of the cooling water flow passage respectively, so that the moisture air flowing upward vertically through the moisture air flow passage is condensed by the atmospheric air flowing horizontally through the condensing air flow passage, and the cooling water flowing downward by gravity through the cooling water flow passage is cooled by indirect contact with the atmospheric air flowing horizontally through the condensing air flow passage. Thus the performance of plume abatement may be improved and evaporated water may be recovered efficiently by reducing the amount of the cooling water evaporated in the filler and increasing efficiently the temperature of the condensing air to be heat-exchanged by indirect contact of condensing air with both the cooling water and the moisture air, and also making it low humidity.

Furthermore, another object of the present invention is to provide an apparatus and a method using the apparatus in which the cooling water is cooled by the condensing air which has a lower temperature than the moisture air by allowing the cooling water to flow through both the cooling water flow passage and the moisture air flow passage in the summer when the plume is not visible, thereby increasing cooling efficiency.

In addition, another object of the present invention is to provide an apparatus and a method using the apparatus, capable of mixing efficiently the moisture air and the heated condensing air on a central upper part of the cooling tower plenum for the better abatement of plume.

Furthermore, other object of the present invention is also to provide a cooling water distribution device in which a spray of cooling water is provided along a width of the heat exchange-condensation panel assembly. The cooling water distributed to the cooling water flow passage and/or the moisture air flow passage of the heat exchange-condensation panel assembly evenly flows without a dead zone, thereby increasing heat exchange efficiency between the cooling water and the condensing air and between the cooling water and the moisture air in the heat exchange-condensation panel assembly and improving the performance of the plume abatement and recovering the evaporated water efficiently.

One aspect of the present invention provides a heat exchange-condensation panel assembly comprising a plurality of moisture air flow passages, a plurality of cooling water flow passages and a plurality of condensing air flow passages, wherein the moisture air flow passage is arranged adjacently to the condensing air flow passage so that the moisture air passing through the moisture air flow passage is condensed by the condensing air passing through the condensing air flow passage, and the cooling water flow passage is arranged adjacently to the condensing air flow passage so that the cooling water passing through the cooling water flow passage is cooled by the condensing air passing through the condensing air flow passage.

In the heat exchange-condensation panel assembly, the plurality of moisture air flow passages are formed with one pair of panels, the plurality of cooling water flow passages are formed with another pair of panels, and the plurality of condensing air flow passages are formed by coupling one pair of panels and another of panels.

Another aspect of the present invention provides a heat exchange-condensation panel assembly which is coupled to form a plurality of moisture air flow passages which are arranged on a discharging passage of an air containing vapor (moisture air) and through which the moisture air flows; a plurality of cooling water flow passages through which the cooling water flows; and a plurality of condensing air flow passages through which the condensing air (the atmospheric air) flows, including: a panel assembly of the moisture air flow passage provided with a pair of panels wherein protruding portions formed on inner surfaces of the panels respectively, are adhered to each other to form the moisture air flow passage therein, and a plurality of conduit elements each of which is recessed on outer surfaces of the pair of panels and a plurality of coupling portions, each of which protrudes outside, are provided in side-by-side parallel; and a panel assembly of the cooling water flow passage provided with a pair of panels wherein protruding portions formed on inner surfaces of the panels respectively, are adhered to each other to form the cooling water flow passage therein, and a plurality of conduit elements each of which is recessed on outer surfaces of the pair of panels and a plurality of coupling portions each of which protrudes outside are provided in side-by-side parallel, wherein a plurality of condensing air flow passage each of which is in a conduit shape are formed in side-by-side parallel by adhering together the coupling portion of the panel assembly of the moisture air flow passage and the coupling portion of the panel assembly of the cooling water flow passage in such a manner that the conduit elements of the panel assembly of the moisture air flow passage are faced to the conduit elements of the panel assembly of the cooling water flow passage.

Another aspect of the present invention provides a plume abatement and evaporated water recovery apparatus which is arranged on a discharging passage of an air containing vapor (moisture air) and is provided with a plurality of moisture air flow passages which moisture air flows and a plurality of condensing air (atmospheric air) flow passages which the condensing air flows so that water in the moisture air is condensed by the condensing air, including: a heat exchange-condensation panel assembly provided with a plurality of moisture air flow passages, a plurality of cooling water flow passages and a plurality of condensing air flow passages wherein the moisture air flow passage is arranged adjacently to the condensing air flow passage so that the moisture air is condensed by the condensing air, and the cooling water flow passage is arranged adjacently to the condensing air flow passage so that the cooling water flows through the cooling water flow passage is cooled by the condensing air; a first cooling water distribution means that is arranged on a top of the heat exchange-condensation panel assembly and is distributed to an inlet of the cooling water flow passage of the heat exchange-condensation panel assembly; a filler that is arranged on a lower part of the heat exchange-condensation panel assembly and heat-exchanges the cooling water with the air introduced into a cooling air inlet; and a second cooling water distribution means that is arranged between a lower part of the heat exchange-condensation panel assembly and a top of the filler, and is distributed the remaining cooling water excepting the cooling water distributed by the first cooling water distribution, over the filler.

Another aspect of the present invention provides a method of abating the plume and recovering evaporated water vapor which is performed by condensing water vapor contained in the moisture air and abating the plume through heat exchange of the moisture air and the cooling water with the atmospheric air by using a cooling tower including a wet portion at a lower part and a dry portion at an upper part wherein a filler is arranged on the wet portion at a lower part, wherein a fan is arranged on the upper part, and wherein the heat exchange-condensation panel assembly which is provided with a plurality of moisture air flow passages through which moisture air flows, a plurality of cooling water flow passages through which cooling water flows and a plurality of condensing air flow passages through which the atmospheric air (condensing air) flows, on the dry portion at an upper part, including: a first cooling water distribution step of distributing a part of the cooling water to be cooled at the cooling water flow passage of the heat exchange-condensation panel assembly arranged on the drying portion at an upper part of the cooling tower; a second cooling water distribution step of distributing the rest of the cooling water to be cooled at the filler arranged on the wet portion at a lower part of the cooling tower; a step of introducing a moisture air into the wet portion at a lower part of the cooling tower; a step of heat-exchanging the moisture air with the cooling water in the filler; a step of introducing the atmospheric air into the condensing air flow passage of the heat exchange-condensation panel assembly; a step of condensing the moisture air and cooling the cooling water by heat-exchanging both the moisture air and the cooling water with the condensing air in the heat exchange-condensation panel assembly; and a step of mixing with the atmospheric air having a temperature of which is increased by heat-exchanging with both the moisture air and the cooling water, with the moisture air condensed by the atmospheric air.

Further, another aspect of the present invention provides a cooling water distribution device onto a top of heat exchange-condensation panel assembly which is provided with a plurality of moisture air flow, a plurality of cooling water flow passages and a plurality of condensing air flow passages including: a body portion which is arranged on a top of the heat exchange-condensation panel assembly and has a length corresponding to a traverse length of the heat exchange-condensation panel assembly and in which a space for receiving the cooling water is formed; a cooling water inlet arranged on one side of the body portion; and a nozzle portion that is arranged on a lower end of the body portion, is formed along an entire length in a longitudinal direction of the body portion to have at least one slit which the cooling water is discharged, and is disposed within the inlet of the cooling water flow passage of the heat exchange-condensation panel assembly.

Furthermore, another aspect of the present invention provides a cooling water distribution device used in a plume abatement and evaporated water recovery apparatus, including: a heat exchange-condensation panel assembly to be coupled to form a plurality of moisture air flow passages, a plurality of cooling water flow passages and a plurality of condensing air flow passages; a cooling water distribution means arranged on a top of the heat exchange-condensation panel assembly and distributing a part of the cooling water to be cooled to the inlet of the cooling water flow passage of the heat exchange-condensation panel assembly; a filler that is arranged on a lower part of the heat exchange-condensation panel assembly and heat-exchanges the cooling water with the air introduced into the cooling air inlet; and a second cooling water distribution means arranged between a lower part of the heat exchange-condensation panel assembly and a top of the filler and distributing the rest of the cooling water to be cooled over the filler except for the cooling water distributed through the cooling water distribution device wherein it includes: a body portion which is arranged on a top of the heat exchange-condensation panel assembly and has a length corresponding to a traverse length of the heat exchange-condensation panel assembly and in which a space for receiving the cooling water is formed; a cooling water inlet arranged on one side end of the body portion; and a nozzle portion that is arranged on a lower end of the body portion, is formed along an entire length in a longitudinal direction of the body portion to have at least one slit which the cooling water is discharged, and is disposed within the inlet of the cooling water flow passage of the heat exchange-condensation panel assembly.

BRIEF DESCRIPTION OF THE DRAWINGS

The above and other features of the present invention will now be described in detail with reference to certain exemplary embodiments thereof illustrated by the accompanying drawings which are given herein below by way of illustration only, and thus are not limitation of the present invention, and wherein:

FIG. 4A is a perspective view illustrating a panel assembly of moisture air flow passages and a panel assembly of cooling water flow passages in the heat exchange-condensation panel assembly according to an exemplary embodiment of the present invention;

DETAILED DESCRIPTION

Figure 1:
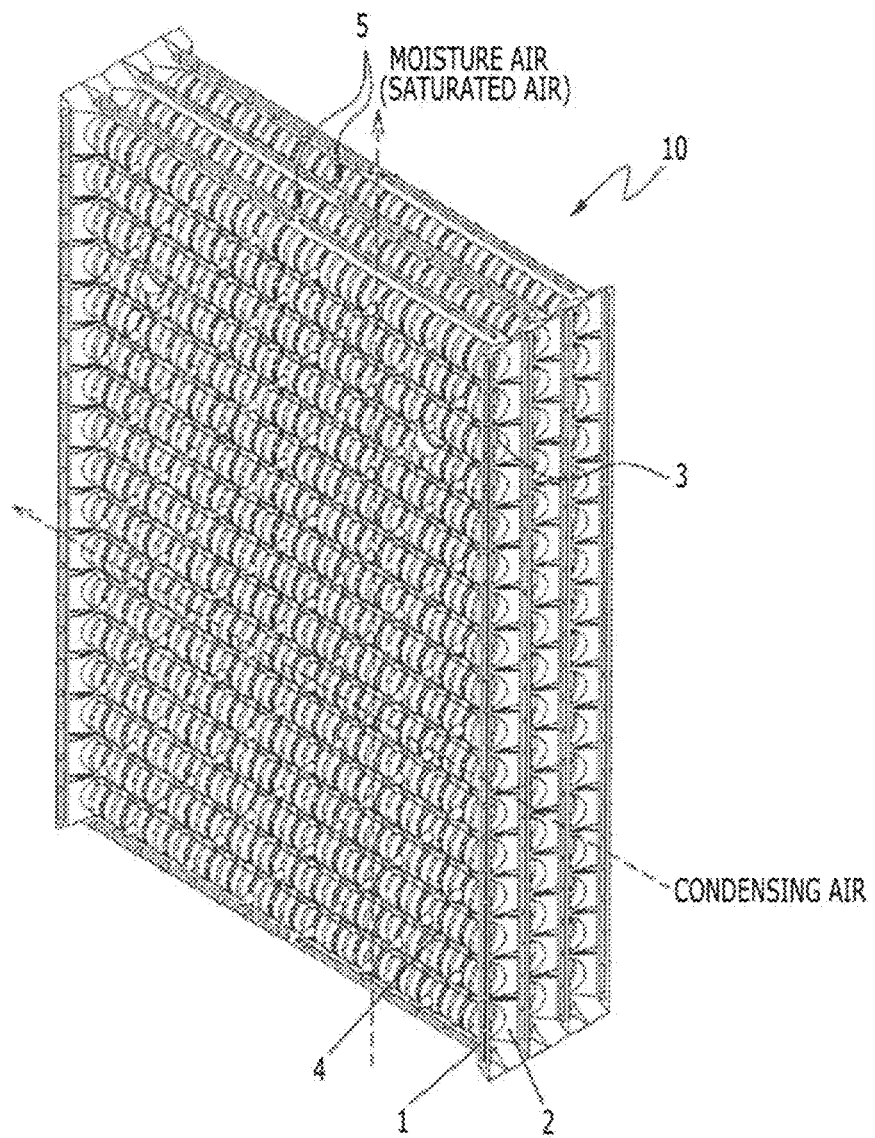
FIG. 1 is a perspective view illustrating a condenser according to the prior art.
Figure 2:
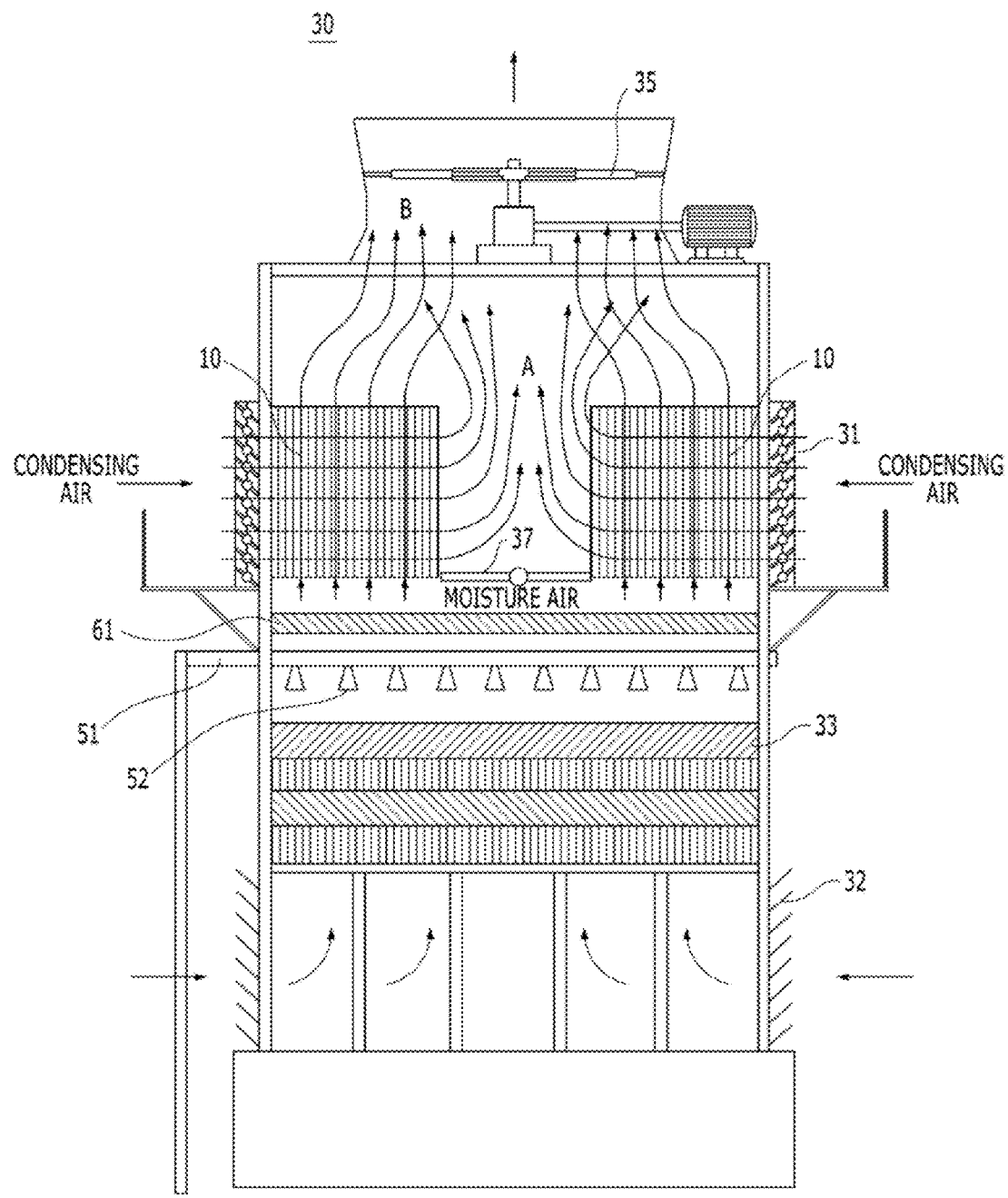
FIG. 2 is a perspective view illustrating the condenser shown in FIG. 1 according to the prior art, which is mounted to a cooling tower.

The objects, features and advantageous effects thereof will be obvious through exemplary embodiments of the present invention, which will be described with reference to the accompanying drawings.

The special configurations and functional descriptions are merely exemplary for describing the embodiments according to the present invention, and further the embodiments of the present invention may be replaced by various modifications, and thus it should not be construed as limiting thereto.

The embodiments according to a concept of the present invention may be changed variously and have various types and thus the special embodiments will be illustrated in the drawings and described in the specification. However, the embodiments according to a concept of the present invention are not limited to the specifically disclosed types and thus it should be understood that it includes all modifications and equivalents or replacements included within a spirit and a scope of the present invention.

Although terms like a first and a second are used to describe various components, but the components are not limited to these terms. These terms are used only to differentiate one component from another one, for example, the first component can be referred to as the second component, or the second component can be referred to as the first component, without departing from the scope of the present invention.

It also should be understood that when it is stated that one component is "connected" or "coupled" to another component, even though the one component may be directly connected or coupled to the another component, but there may be other components between them. However, it has to be understood that when it is stated that one component is "directly connected" or "directly coupled" to another component, there is no intermediate component between them. The terms used for describing a relation among other components, that is, "between", "right between" "adjacent to" or "directly adjacent to" have to be construed similarly.

The terminology used herein is for the purpose of describing particular embodiments only and is not intended to be limiting to the embodiments. As used herein, unless otherwise defined, the singular forms "a," "an" and "the" are intended to include the plural forms as well. Unless the context indicates otherwise, it will be further understood that the terms "comprises" and/or "having" when used in this specification, specify the presence of stated features, integers, steps, operations, elements, and/or components, but do not preclude the presence or addition of one or more other features, integers, steps, operations, elements, components, parts or combination thereof.

All terms including technical or scientific terminology used herein have the same meaning as commonly understood by one of ordinary skill in the art to which example embodiments belong. It will be further understood that teens, such as those defined in commonly used dictionaries, should be interpreted as having a meaning that is consistent with their meaning in the context of the relevant art and will not be interpreted in an idealized or overly formal sense unless expressly so defined herein.

Hereinafter, reference numerals will now be made in detail to various embodiments of the present invention, examples of which are illustrated in the accompanying drawings and described below. In the drawings, the same reference numerals refer to the same components.

A heat exchange-condensation panel assembly according to the present invention may be arranged on various facilities including a cooling tower or a chimney, etc., through which a gas containing water vapor (hereinafter, referred to as "moisture air") is discharged into the atmosphere. Here, a moisture air may be a saturated air containing maximum amount of moisture that it can hold at particular temperature. The heat exchange-condensation panel assembly includes a moisture air flow passage, a condensing air flow passage and a cooling water flow passage. The condensing air flow passages are arranged on both sides of the moisture air flow passage and also on both sides of the cooling water flow passage, respectively, so that the moisture air that flows upward vertically through the moisture air flow passage is condensed by the atmospheric air that flows horizontally through the condensing air flow passage and the cooling water that flows downward by gravity through the cooling water flow passage is cooled by indirect contact with the atmospheric air that flows horizontally through the condensing air flow passage. Thus, evaporation amount of the cooling water in the filler is reduced and the temperature of condensing air with which the moisture air removal efficiently is increased, thereby improving plume abatement and recovering evaporated water efficiently.

Figure 3:
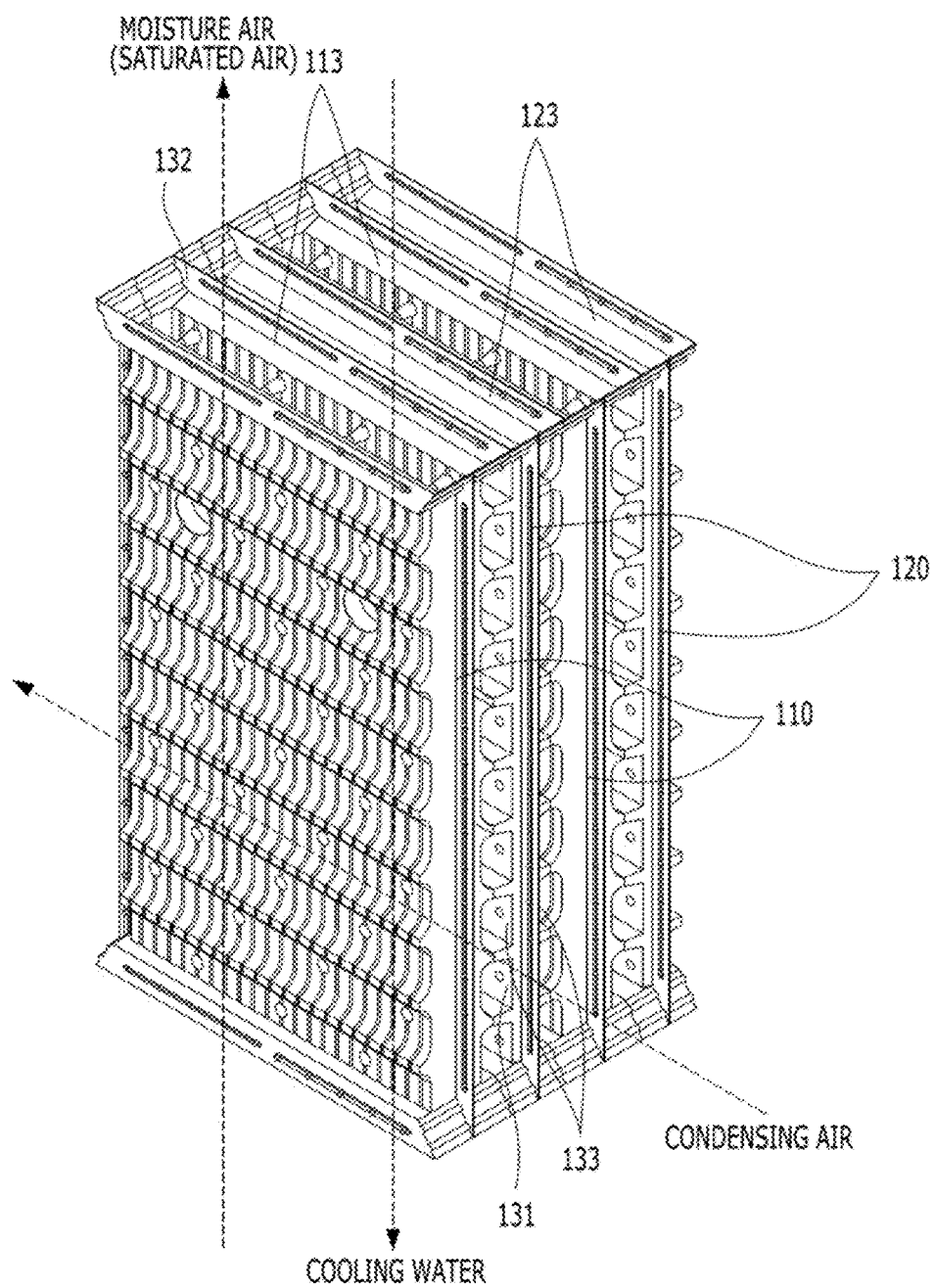
FIG. 3 is a perspective view illustrating a heat exchange-condensation panel assembly having three type passages according to an exemplary embodiment of the present invention.
Figure 6:
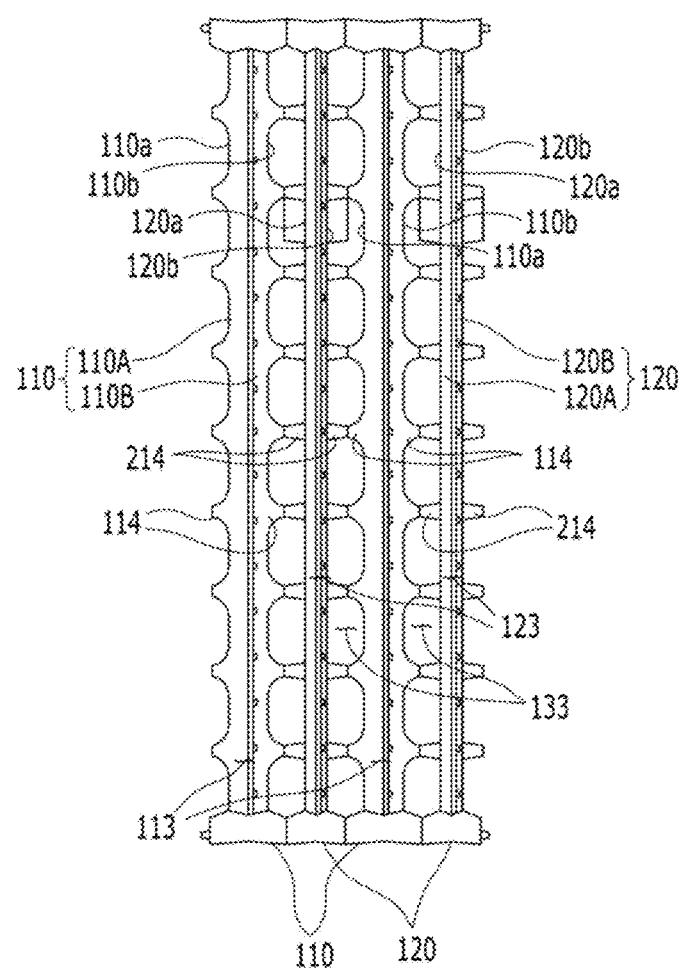
FIG. 6 is a side view illustrating the heat exchange-condensation panel assembly as shown in FIG. 3, according to an exemplary embodiment of the present invention.
Figure 7:
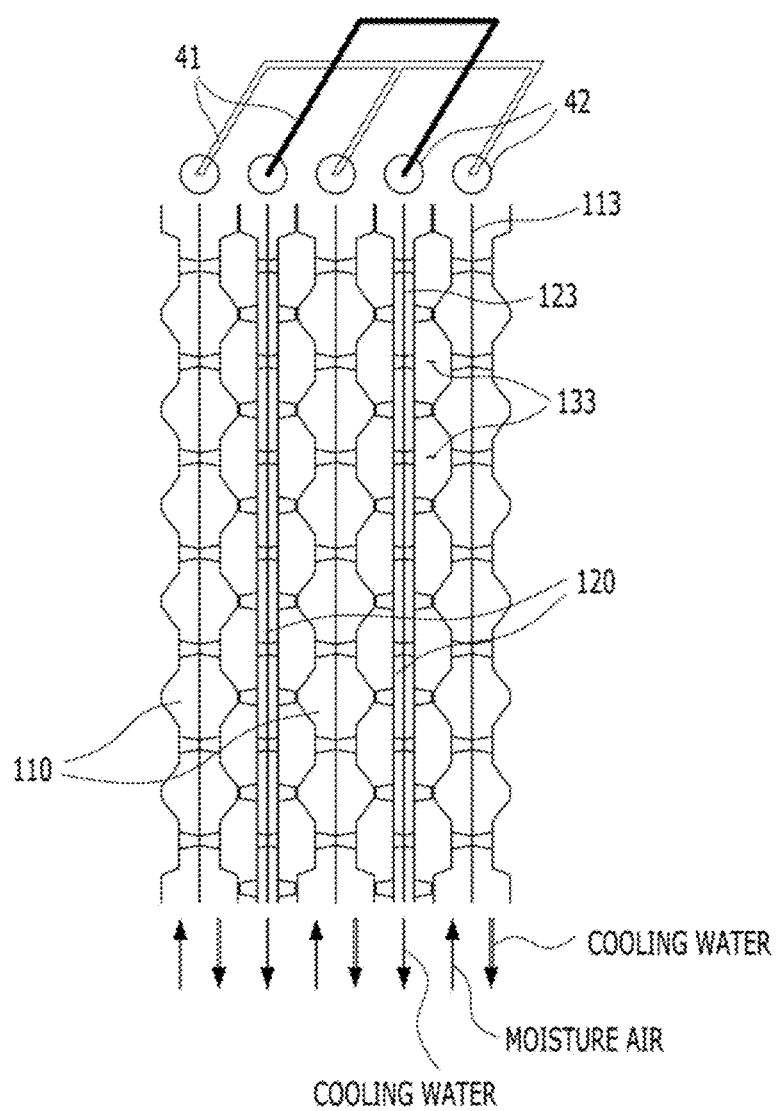
FIG. 7 is a side-sectional view illustrating the heat exchange-condensation panel assembly as shown in FIG. 3, according to an exemplary embodiment of the present invention.

FIG. 3 is a perspective view illustrating an entire configuration of the heat exchange-condensation panel assembly 100 having three type passages according to an exemplary embodiment of the present invention, FIG. 6 is a side view illustrating the heat exchange-condensation panel assembly 100 as shown in FIG. 3, and FIG. 7 is a side-sectional view illustrating the heat exchange-condensation panel assembly 100 as shown in FIG. 3.

In the heat exchange-condensation panel assembly 100, condensing air flow passages 133 are arranged on both sides of a moisture air flow passage 113, and the condensing air flow passages 133 are arranged on both sides of a cooling water flow passage 123. Thus, the moisture air flow passage 113, the condensing air flow passage 133, the cooling water flow passage 123, the condensing air flow passage 133 and the moisture air flow passage 113 are sequentially arranged in order.

A panel assembly 110 of the moisture air flow passage of the heat exchange-condensation panel assembly 100 may be formed entirely as a generally rectangular plate shape wherein a pair of panels 110A, 110B each having a protruding portion 118 in its inside are coupled each other to form a space of the moisture air flow passage 113 therebetween. The moisture air flow passage 113 forms a passage where an inlet at a lower part and an outlet at an upper part are opened and other parts are shielded from an outside. The inlet and the outlet of the moisture air flow passage 113 may be enlarged gradually toward the remote ends thereof (FIG. 3). Further, a plurality of conduit elements 110a, 110b each having a recessed profile and a plurality of connecting portions 114 each protruding outward are provided in side-by-side parallel on outer surfaces of the pair of panels 110A, 110B, respectively.

A panel assembly 120 of the cooling water flow passage of the heat exchange-condensation panel assembly 100 may be formed entirely as a generally rectangular plate shape wherein a pair of panels 120A, 120B each having a protruding portion 218 in its inside are coupled each other to form a space of the cooling water flow passage 123 therebetween. Here, protrusions (not shown) of reversed-V shapes in wave forms may be zigzagged repeatedly formed on each of the inner surfaces of the panels 120A, 120B constituting the panel assembly 120 of the cooling water flow passage 123 in order to increase contact area with the cooling water and prolong contact time period. The cooling water flow passage 123 forms a passage where an inlet at a lower part and an outlet at an upper part are opened and other parts are shielded from an outside. The inlet and the outlet may be enlarged gradually toward the remote ends thereof (FIG. 3). Further, a plurality of conduit elements 120a, 120b each having a recessed profile and a plurality of connecting portions 214 each protruding outside are provided in side-by-side parallel on an outer surface of the pair of panels 120A, 120B, respectively.

A plurality of the condensing air flow passages 133 each of which is shaped as a conduit type in the heat exchange-condensation panel assembly 100 according to an exemplary embodiment of the present invention, as shown in FIGS. 4A-4C and 6, may be formed in side-by-side parallel by coupling the panel assembly 110 of the moisture air flow passage and the panel assembly 120 of the cooling water flow passage. The connecting portions 114 of the panel assembly 110 of the moisture air flow passage and the connecting portions 214 of the panel assembly 120 of the cooling water flow passage are adhered together such that the conduit elements 110b on an outer surface of the panel 110B (of the panel assembly 110 of the moisture air flow passage) are faced each other to the conduit elements 120a on an outer surface of the panel 120A (of the panel assembly 120 of the cooling water flow passage) and the conduit elements 110a on the outer surface of the panel 110A are faced each other to the conduit elements 120b on the outer surface of the panel.

The condensing air flow passage 133 and the moisture air flow passage 113 may be arranged in such a manner that a flow of the condensing air intersects to that of the moisture air. That is, as shown in FIG. 3, when the condensing air flows horizontally in the condensing air flow passage 133, the moisture air may flow vertically in the moisture air flow passage 113. For this purpose, in the embodiment as shown in the drawings, it is exemplary shown that the inlets and the outlets provided at both side ends of the panel assembly 110 of the moisture air flow passage, respectively, are coupled each other so that the moisture air flow passage 113 is formed as a configuration where left/right ends are closed and upper/lower ends are opened.

Further, the condensing air flow passage 133 and the cooling water flow passage 123 may be arranged in such a manner that a flow of the condensing air intersects that of the cooling water. That is, as shown in FIG. 3, when the condensing air flows horizontally in the condensing air flow passage 133, the cooling water may flow vertically in the cooling water flow passage 123. For this purpose, in the embodiment as shown in the drawing, it is exemplary shown that the inlets and the outlets provided at both side ends of the panel assembly 120 of the cooling water flow passage, respectively, are coupled each other so that the cooling water flow passage 123 is formed as a configuration where left/right ends are closed and upper/lower ends are opened.

Next, referring to FIGS. 8 and 9, the panel assembly 110 of the moisture air flow passage of the heat exchange-condensation panel assembly 100 according to the present invention will be described.

Figure 8:
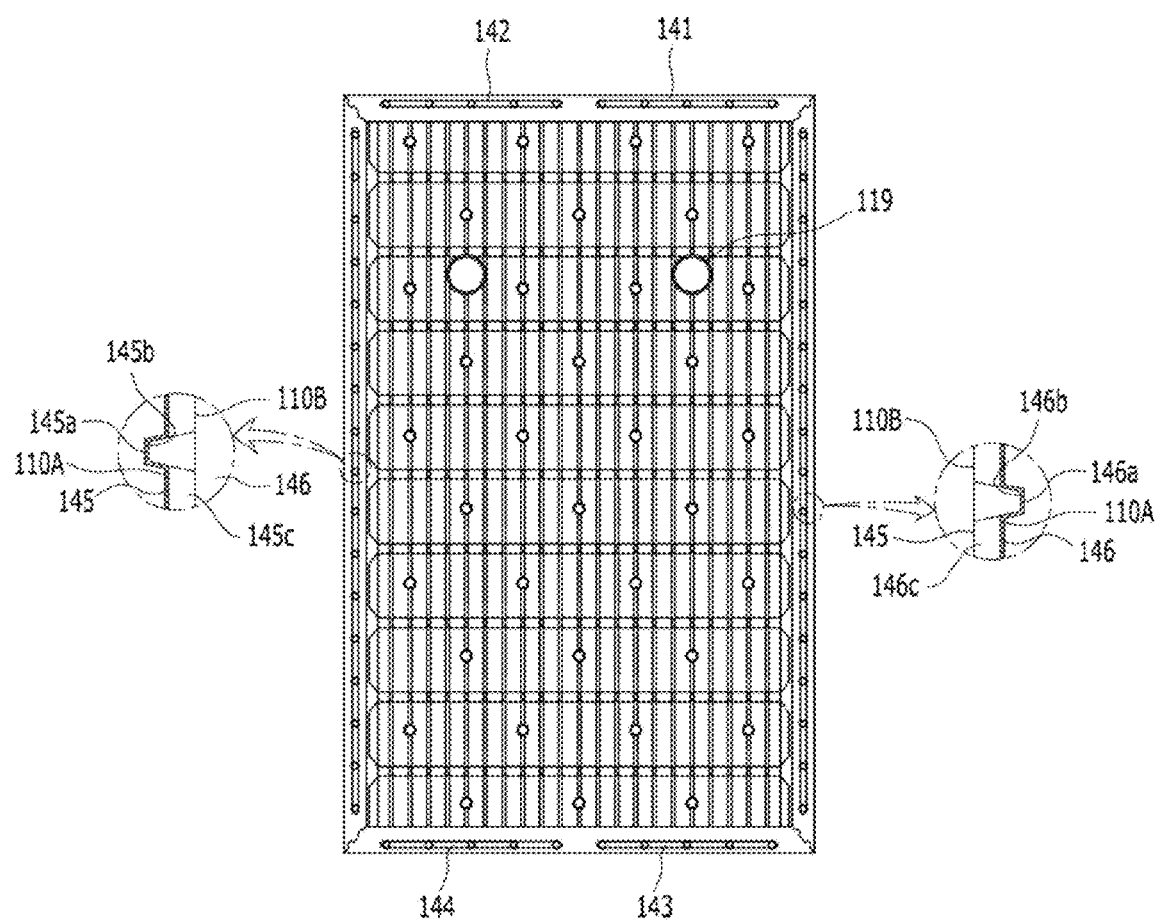
FIG. 8 is a front view illustrating a panel assembly of moisture air flow passages in the heat exchange-condensation panel assembly as shown in FIG. 3, according to an exemplary embodiment of the present invention.
Figure 9:
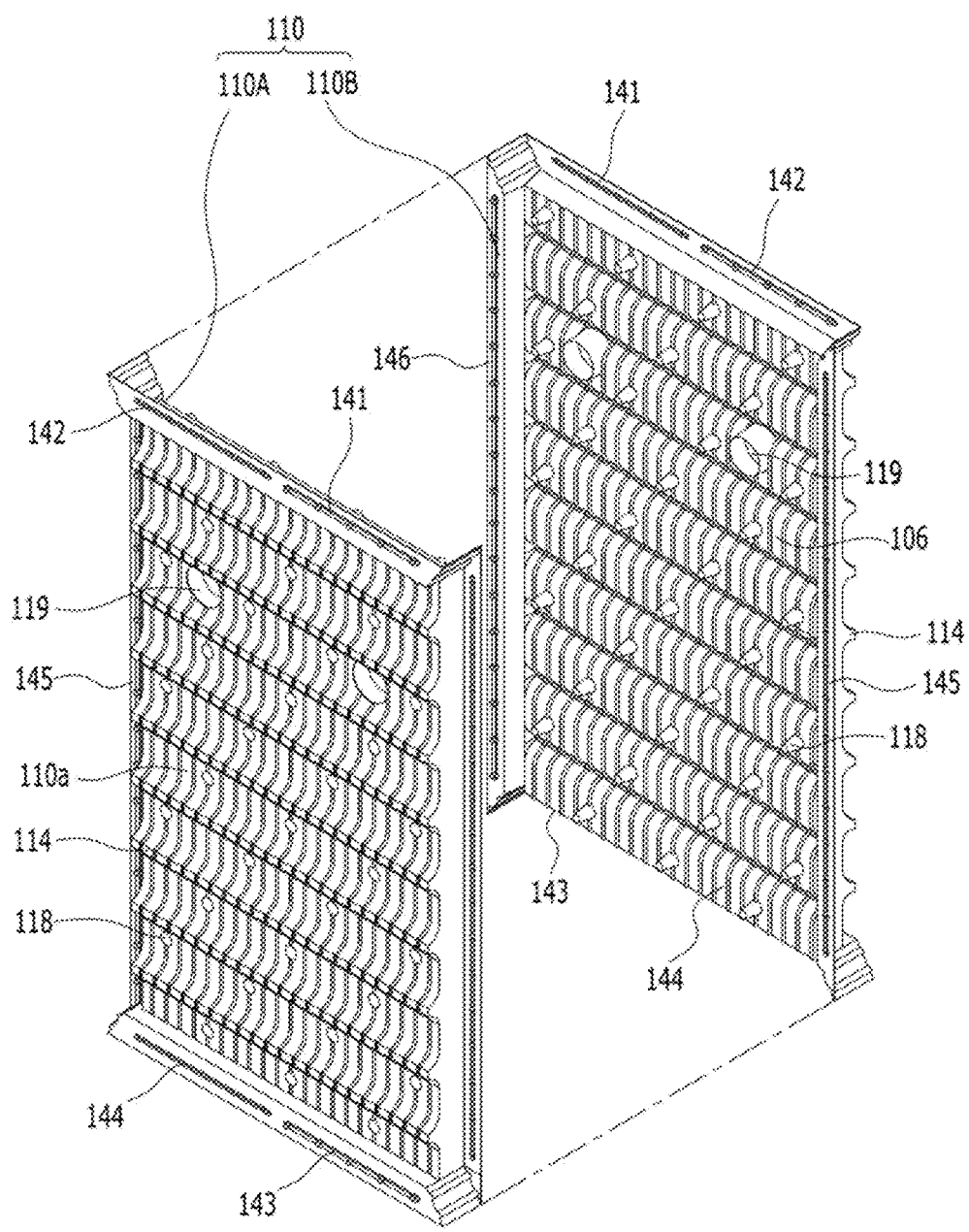
FIG. 9 is an exploded-perspective view illustrating a panel assembly of moisture air flow passages in the heat exchange-condensation panel assembly having three type passages as shown in FIG. 3, according to an exemplary embodiment of the present invention.

The panel assembly 110 of the moisture air flow passage, as shown in FIG. 8, may be formed entirely as a generally rectangular plate shape, and as shown in FIG. 9, by adhering together the protruding portions 118 formed on inside of the pair of panels 110A, 110B, respectively, to form a space between the pair of panels. Here, coupling portions 141, 142, 143, 144, 145, 146 may be provided on edges of upper and lower ends, and left and right ends of the respective panels 110A, 110B, respectively. The coupling portion 145 may protrude forward and the coupling portion 146 may protrude rearward. Further, insertion grooves 145c, 146c may be formed on rear surfaces of the coupling portions 145, 146, respectively. Thus, as shown in FIG. 8, the coupling portion 145 of the panel 110B may be inserted into the insertion groove 146c of the panel 110A, and the coupling portion 146 of the panel 110B may be inserted into the insertion groove 145c of the panel 110A for coupling them, respectively. In the embodiment as shown in the drawings, each of the coupling portions 141, 142, 143, 144, 145, 146 is formed as an elongated band shape along each end of the panels; however, the coupling portions 141, 142, 143, 144, 145, 146 are not limited thereto, and they may be formed in various shapes at various locations.

Furthermore, the coupling portions 145, 146 of the respective panels 110A, 110B of the panel assembly 110 of the moisture air flow passage may be provided with fixing protrusions 145a, 146a each of which protrudes outwardly, respectively, and fixing grooves 145b, 146b into which the fixing protrusions of another panel are inserted, respectively, may be formed on the rear surfaces of the fixing protrusions. As a result, as shown in FIG. 8, the fixing protrusion 146a of the panel 110B may be inserted into the fixing groove 145b of the panel 110A, and the fixing protrusion 145a of the panel 110B may be inserted into the fixing groove 146b of the panel 110A for insertion coupling, respectively.

Furthermore, a plurality of the coupling portions 141, 142, 143, 144 may be formed at symmetrical locations of the respective panels 110A, 110B to form a pair wherein the paired coupling portions (141 and 142; 143 and 144) of both panels protrude each other to the opposed directions, respectively (FIG. 9), and the insertion grooves 141c, 142c, 143c, 144c are formed on opposing surfaces of the coupling portions 141, 142, 143, 144 respectively, so that the panels 110A, 110B having same forms can be coupled to a facing direction thereof (the insertion grooves 143c, 144c are not shown in FIG. 8). That is, referring to, as an example, the coupling portions 141, 142 provided on an upper part of the panels 110A, 110B, respectively, the coupling portions 141, 142 of both panels protrude at symmetrical locations based on the vertical center axis to the opposed directions, and when the panels 110A, 110B are arranged in such a manner that the protruding portion 118 formed on an inner surface of the panel 110A and the protruding portion 118 formed on an inner surface of the panel 110B are faced (see FIG. 5), the coupling portions 141, 142 of both panels may be disposed to be inserted each other. That is, the coupling portions 142 may be inserted into the insertion grooves 141c. Here, an adhesive may be applied on contact surfaces of the protruding portions 118 of the panels 110A, 110B.

Figure 5:
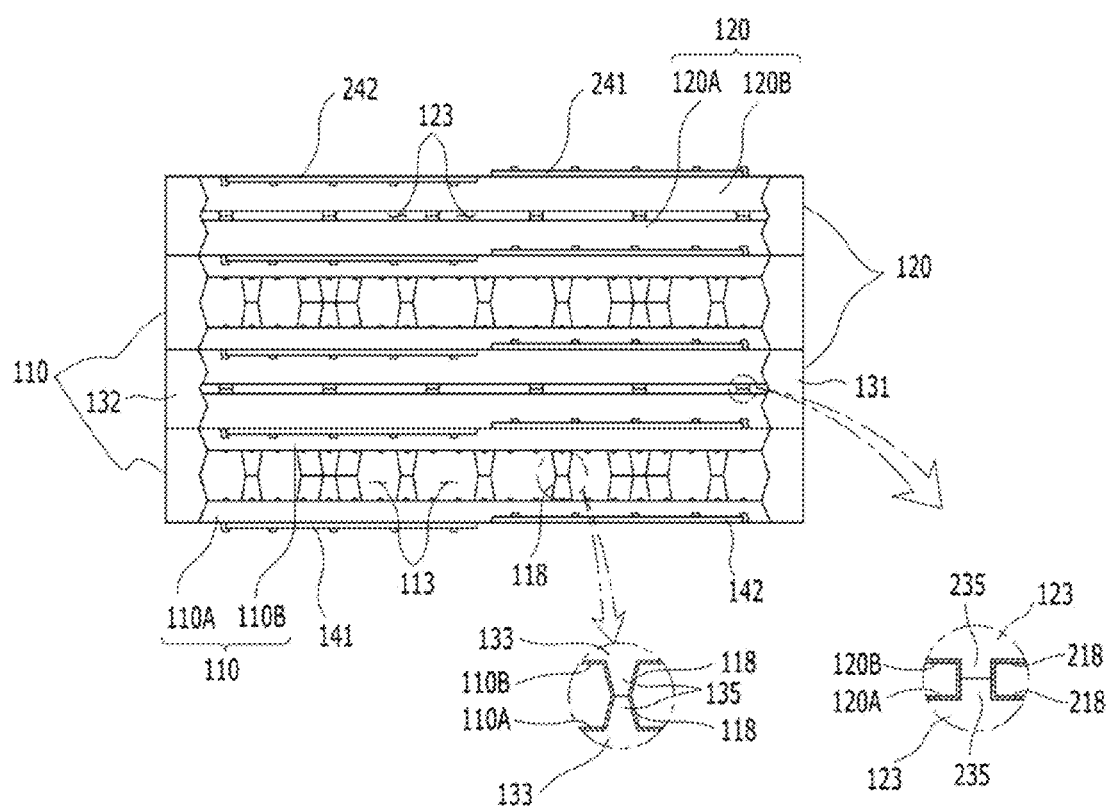
FIG. 5 is a plan view illustrating the heat exchange-condensation panel assembly as shown in FIG. 3, according to an exemplary embodiment of the present invention.

The protruding portions 118 of each of the panels 110A, 110B of the panel assembly 110 of the moisture air flow passage may be coupling means between the panels 110A, 110B and also be arranged transversely at the moisture air flow passage 113 to serve as means for increasing heat exchange area to be in contact with the moisture air. Preferably, as shown in FIG. 5, space portions 135 may be formed on the inside of the protruding portions 118 to be communicated with the recessed surface of the conduit elements 110a, 110b on the outer surfaces of the panels 110A, 110B. Here, the space portion 135 may be a passage in which outer ends are opened and in this case, the condensing air flow passages 133 on both sides can be communicated with each other through the space portions 135 of the protruding portions 118.

Further, through holes 119 for fitting a hanger pipe may be formed through the panels 110A, 110B of the panel assembly 110 such that the heat exchange-condensation panel assembly 100 may be installed easily on the cooling tower.

Next, referring to FIGS. 10 and 11, a panel assembly 120 of a cooling water flow passage of the heat exchange-condensation panel assembly 100 according to the present invention will be described.

Figure 10:
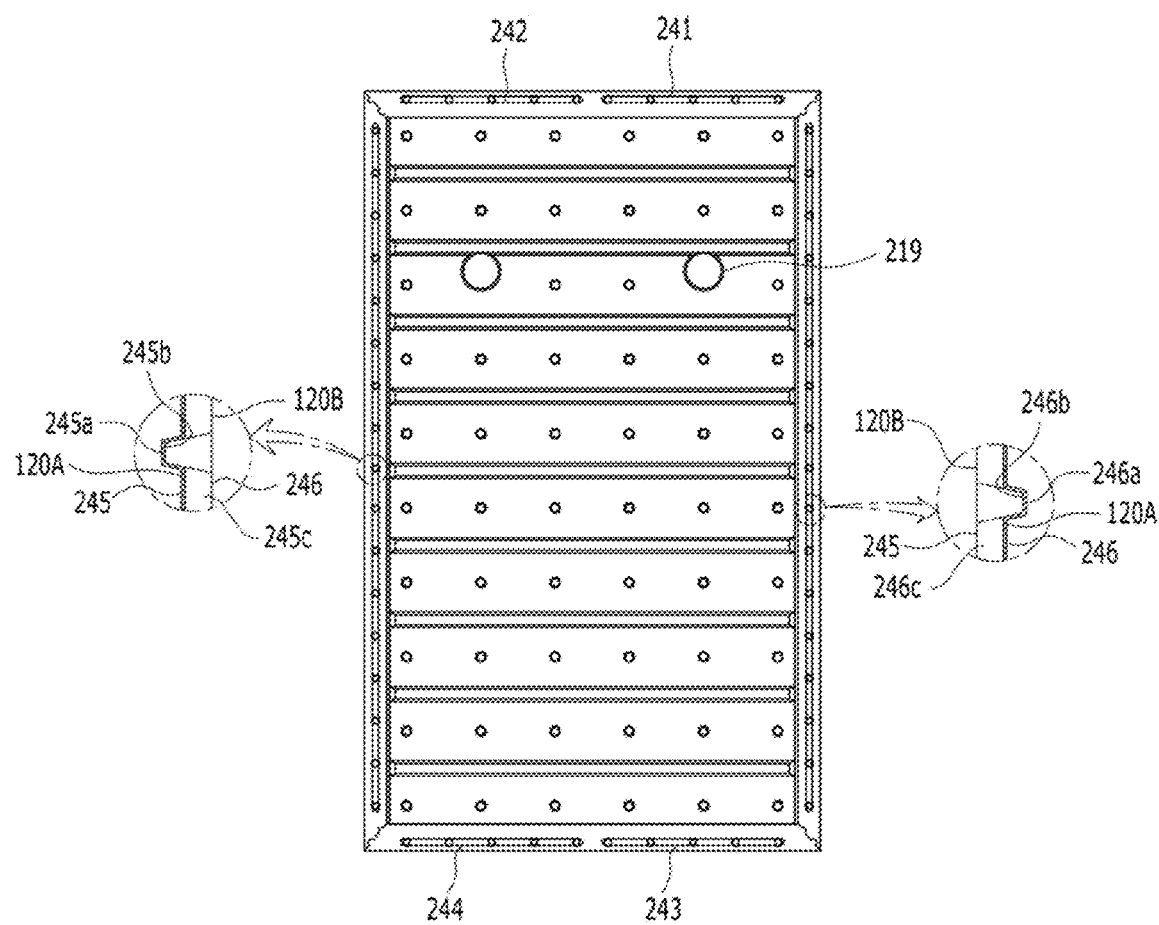
FIG. 10 is a front view illustrating a panel assembly of cooling water flow passages in the heat exchange-condensation panel assembly having three type passages as shown in FIG. 3, according to an exemplary embodiment of the present invention.
Figure 11:
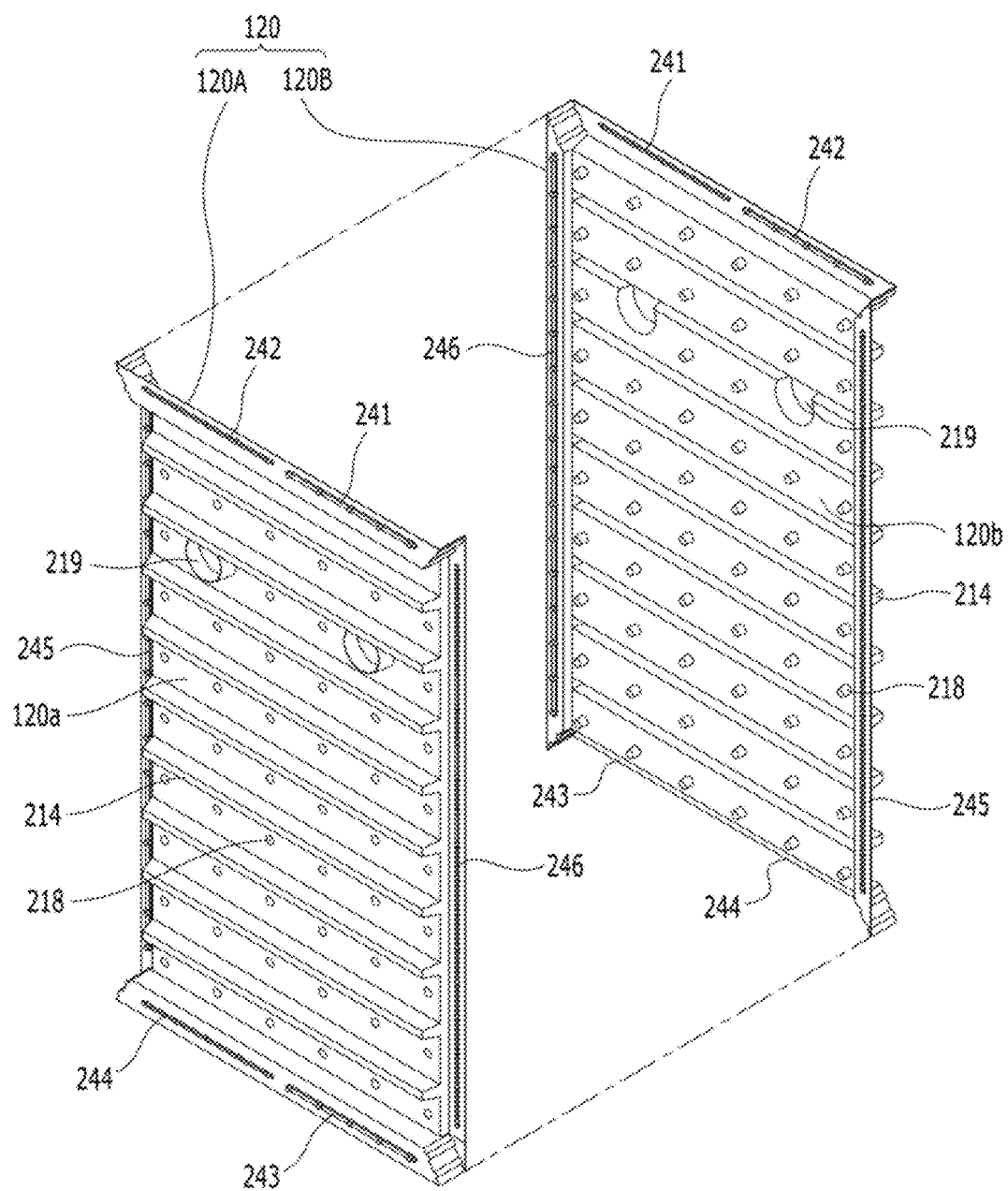
FIG. 11 is an exploded-perspective view illustrating a panel assembly of cooling water flow passages in the heat exchange-condensation panel assembly having three type passages as shown in FIG. 3, according to an exemplary embodiment of the present invention.

The panel assembly 120 of the cooling water flow passage, as shown in FIG. 10, may be formed entirely as a generally rectangular plate shape, and as shown in FIG. 11, it may be formed by adhering together the protruding portions 218 formed on inside of the pair of panels 120A, 120B, respectively, to form a space between the pair of panels. Here, coupling portions 241, 242, 243, 244, 245, 246 may be provided on edges of upper and lower ends, and on left and right ends of the respective panels 120A, 120B. The coupling portion 245 may protrude forward and the coupling portion 246 may protrude rearward. Further, insertion grooves 245c, 246c may be formed on rear surfaces of the coupling portions 245, 246, respectively. Thus, as shown in FIG. 10, the coupling portion 245 of the panel 120B may be inserted into the insertion groove 246c of the panel 120A, and the coupling portion 246 of the panel 120B may be inserted into the insertion groove 245c of the panel 120A for coupling them, respectively. In the embodiment as shown in the drawings, each of the coupling portions 241, 242, 243, 244, 245, 246 is formed as an elongated band shape along each end of the panels; however, the coupling portions 241, 242, 243, 244, 245, 246 are not limited thereto, and they may be formed as various shapes at various locations.

Further, the coupling portions 245, 246 of the respective panels 120A, 120B of the panel assembly 120 of the cooling water flow passage may be provided with fixing protrusions 245a, 246a each of which protrudes outwardly, respectively, and fixing grooves 245b, 246b into which the fixing protrusions of another panel are inserted, respectively, may be formed on the rear surfaces of the fixing protrusions. As a result, as shown in FIG. 10, the fixing protrusion 246a of the panel 120B may be inserted into the fixing groove 245b of the panel 120A, and the fixing protrusion 245a of the panel 120B may be inserted into the fixing groove 246b of the panel 120A for insertion coupling, respectively.

Furthermore, a plurality of the coupling portions 241, 242, 243, 244 may be formed at symmetrical locations of the respective panels 120A, 120B to form a pair wherein the paired coupling portions (241 and 242; 243 and 244) of both panels may protrude each other to the opposed directions, respectively (FIG. 11), and further the insertion grooves 241c, 242c, 243c, 244c may be formed on opposing surfaces of the coupling portions, respectively, so that the panels 120A, 120B having same form can be coupled to a facing direction thereof (the insertion grooves 143c, 144c are not shown in FIG. 8). That is, referring to, as an example, the coupling portions 241, 242 provided on an upper part of the panels 120A, 120B, respectively, the coupling portions 241, 242 of both panels may protrude from a symmetrical location based on the vertical center axis to the opposed directions, and when the panels 120A, 120B are arranged in such a manner that the protruding portion 218 formed on an inner surface of the panel 120A and the protruding portion 218 formed on an inner surface of the panel 120B are faced, the coupling portions 241, 242 of both panels are disposed to be inserted each other. That is, the coupling portions 242 may be inserted into the insertion grooves 241c. Here, an adhesive may be applied on a contact surface of the protruding portions 218 of the panels 120A, 120B, respectively.

The protruding portion 218 of each of the panels 120A, 120B of the panel assembly 120 of the moisture air flow passage may be coupling means between the panels 120A, 120B and also be arranged transversely at the cooling water flow passage 123 to serve as means for increasing heat exchange area to be in contact with the cooling water. Preferably, as shown in FIG. 5, a space portion 235 may be formed on the inside of the protruding portions 218 to be communicated with the recessed surface of the conduit elements 120a, 120b on an outer surface of the panels 120A, 120B. Here, the space portion 235 may be a passage in which outer ends are opened and in this case, the condensing air flow passages 133 on both sides are communicated with each other through the space portion 235 of the protruding portions 218.

Further, through-holes 219 for fitting a hanger pipe may be formed through the panels 120A, 120B of the panel assembly 120 of the cooling water flow passage such that the heat exchange-condensation panel assembly 100 may be installed easily on the cooling tower.

In subsequent, referring to FIGS. 4A-4C and 6, a condensing air flow passage 133 of the heat exchange-condensation panel assembly 100 according to an embodiment of the present invention will be described.

Figure 4B:
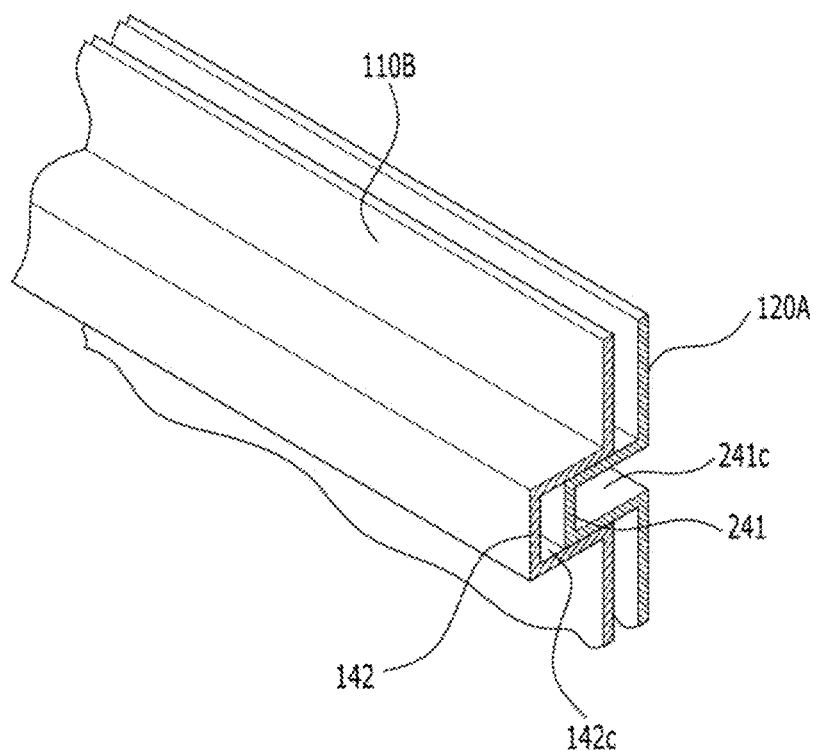
FIG. 4B is a perspective view illustrating partially a state where a coupling portion of one panel 120A of the panel assembly 120 is inserted into an insertion groove of one panel 110B of the panel assembly 110.
Figure 4C:
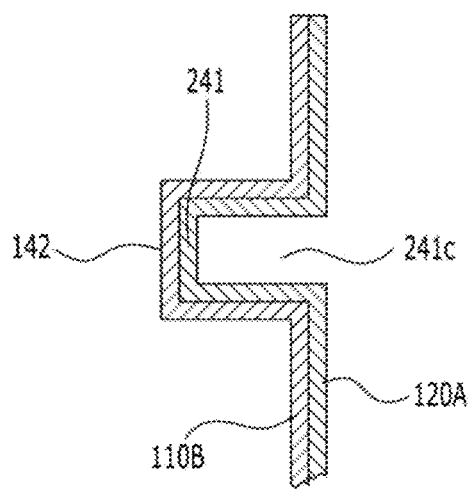
FIG. 4C is a cross section view of the coupling portion and the insertion groove shown in FIG. 4B.

The condensing air flow passage 133 may be formed by adhering together the connecting portions 114 of the panel assembly 110 of the moisture air flow passage and the connecting portions 214 of the panel assembly 120 of the cooling water flow passage such that the conduit elements 110a, 110b on an outer surface of the panel 110B (of the panel assembly 110 of the moisture air flow passage) are faced each other to the conduit elements 120a, 120b on an outer surface of the panel 120A (of the panel assembly 120 of the cooling water flow passage). In this case, as shown in FIGS. 4A, 4B, 4C, the coupling portions 141, 143 of one panel 110B of the panel assembly 110 may be inserted into the insertion grooves 242c, 244c of one panel 120A of the panel assembly 120, respectively, and the coupling portions 241, 243 of one panel 120A of the panel assembly 120 may be inserted into the insertion grooves 142c, 144c of one panel 110B of the panel assembly 110, respectively.

In order to reinforce the coupling between the panel assembly 110 and the panel assembly 120, outwardly protruded fixing protrusions 241a, 243a formed on the coupling portions of one panel 120A, respectively, may be inserted into the fixing grooves 142b, 144b formed on the coupling portions of one panel 110B. Further, outwardly protruded fixing protrusions 141a, 143a formed on the coupling portions of one panel 110A, respectively, may be inserted into the fixing grooves 242b, 244b formed on the coupling portions of one panel 120B.

Next, an operation of the heat exchange-condensation panel assembly 100 according to an embodiment of the present invention will be described.

In the heat exchange-condensation panel assembly according to an embodiment of the present invention, as described-above, the moisture air flow passage 113, the condensing air flow passage 133, the cooling water flow passage 123, the condensing air flow passage 133, and the moisture air flow passage 113 may be arranged sequentially in order wherein the condensing air flow passages 133 may be arranged on both sides of the moisture air flow passage 113, and the condensing air flow passages 133 may be also arranged on both sides of the cooling water flow passage 123, respectively.

According to an embodiment of the present invention, since the condensing air flow passages may be arranged on both sides of the moisture air flow passage and also on both sides of the cooling water flow passage, respectively, the moisture air flowing upward vertically through the moisture air flow passage may be condensed by the atmospheric air flowing horizontally through the condensing air flow passage, and the cooling water flowing downward by gravity through the cooling water flow passage may be cooled by indirect contact with the atmospheric air flowing horizontally through the condensing air flow passage. As a result, the performance of plume abatement can be improved and evaporation water can be recovered efficiently by decreasing the evaporation amount of the cooling water produced in the filler and increasing efficiently the temperature of the condensing air to be heat-exchanged by indirectly contacting the condensing air with both the cooling water and the moisture air, and also making it low humidity.

As shown in FIGS. 6 and 7, since the condensing air flow passages 133 may be arranged on both sides of the moisture air flow passage 113, the moisture air of a high temperature that flows through the moisture air flow passage 113 is in indirect contact with the atmospheric air, i.e., the condensing air that flows through the condensing air flow passage 133. As a result, the condensing air that flows through the condensing air flow passage 133 may absorb heat of the moisture air that flows through the moisture air flow passage 113 to condense water vapor.

Additionally, as shown in FIGS. 6 and 7, since the condensing air flow passages 133 may be arranged on both sides of the cooling water flow passage 123, the cooling water of a high temperature that flows through the cooling water flow passage 123 may be in indirect contact with the atmospheric air, i.e., the condensing air that flows through the condensing air flow passage 133. As a result, the condensing air that flows through the condensing air flow passage 133 may absorb heat of the cooling water of a high temperature that flows through the cooling water flow passage 123 so that the temperature of the condensing air becomes closer to that of the cooling water.

For example, about ⅔ of a total amount of the cooling water to be cooled may be passed through the cooling water flow passage 123 of the heat exchange-condensation panel assembly 100 according to an embodiment of the present invention and then through the filler 33, and the rest of the cooling water (about ⅓ of a total amount of cooling water) may be injected directly over the filler. In this case, about 20% of a total heat removal amount of the cooling water to be cooled may be removed in the heat exchange-condensation panel assembly 100, and the rest heat removal amount of the cooling water to be cooled (about 80% of a total heat removal amount) may be removed in the filler 33. As described-above, the temperature of the cooling water is decreased due to an indirect contact with the condensing air to reduce evaporation amount of the cooling water to about 20% or so thereby decreasing loss of the cooling water from evaporation (since the heat exchange between the cooling water and the condensing air in the heat exchange-condensation panel assembly 100 is a sensible heat exchange, the cooling water is not evaporated).

Further, a temperature of the atmospheric air that passes through the condensing air flow passage 133 while heat-exchanging with the cooling water may become closer to the temperature of the cooling water so that the temperature difference between the air and the moisture air passing through the moisture air flow passage 113 is reduced thereby obtaining a considerable plume abatement effect.

Here, protrusions (not shown) of reversed-V shapes in wave forms may be zigzagged repeatedly formed on each of the inner surfaces of the panels 120A, 120B constituting the panel assembly 120 of the cooling water flow passage 123 such that contact area with the cooling water and prolong contact time period increase.

Figure 12A:
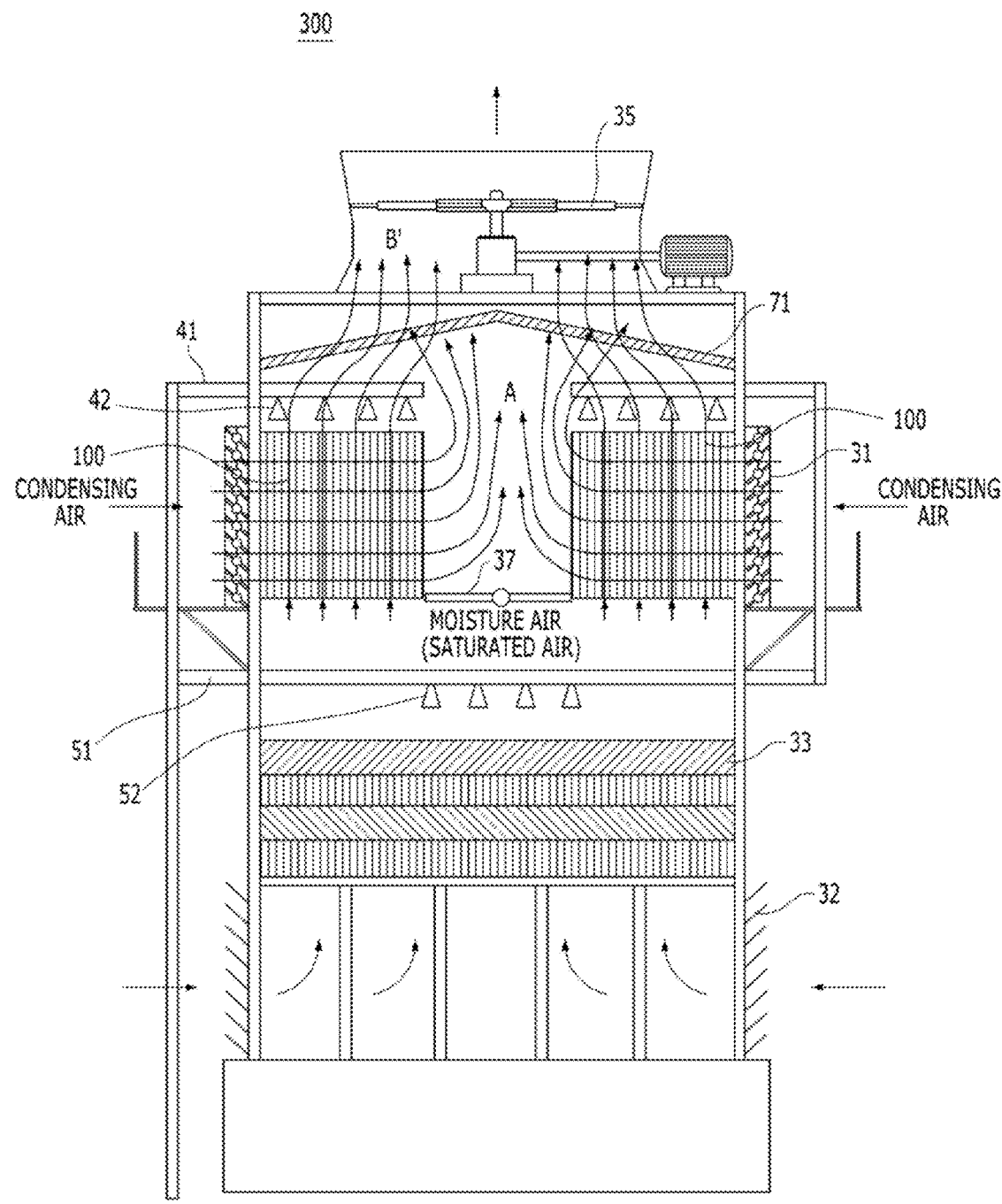
FIG. 12A is a side view illustrating a cooling tower using a heat exchange-condensation panel assembly as shown in FIG. 3, according to an exemplary embodiment of the present invention.
Figure 12B:
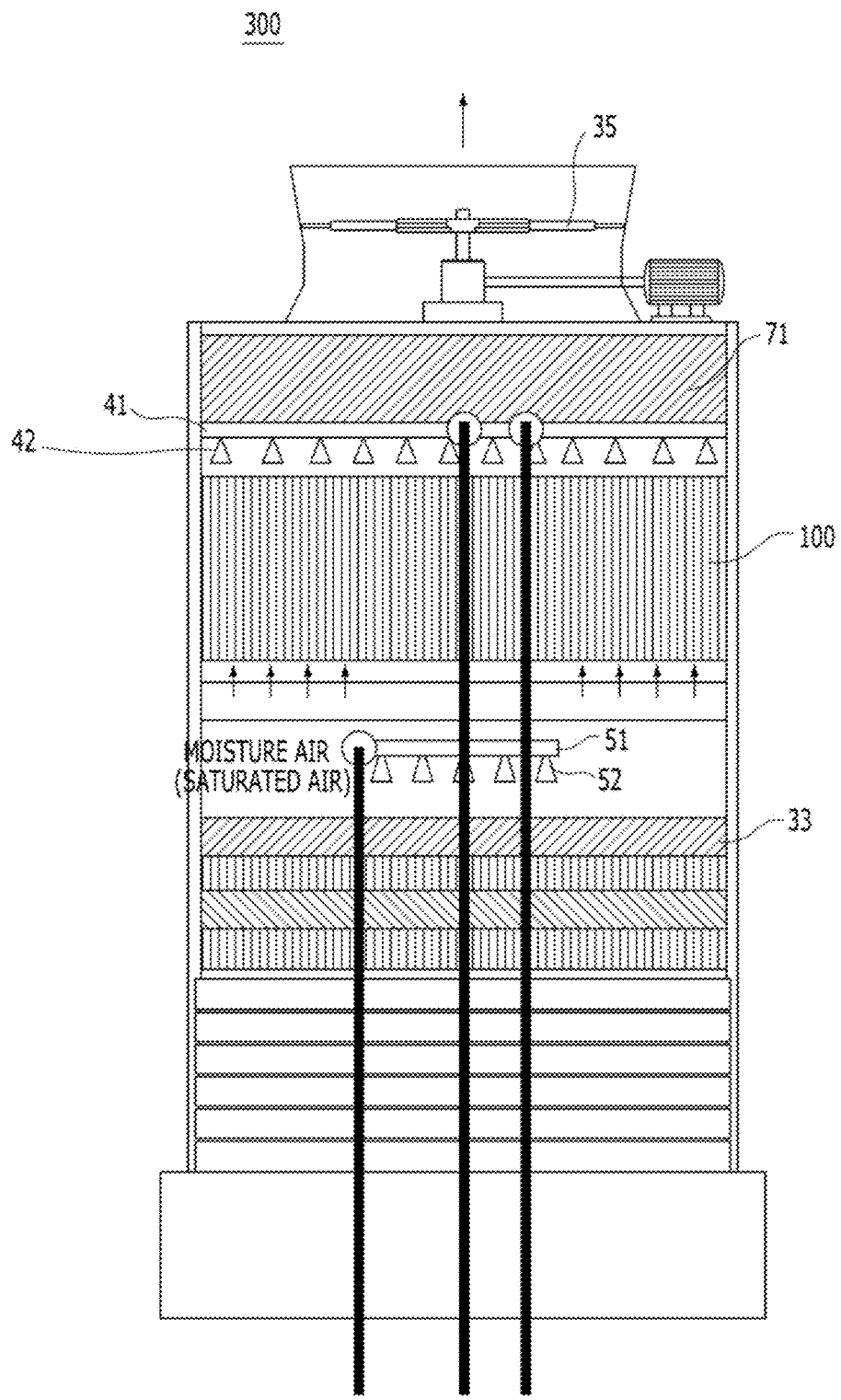
FIG. 12B is a front view illustrating a cooling tower using a heat exchange-condensation panel assembly as shown in FIG. 3, according to an exemplary embodiment of the present invention.
Figure 13:
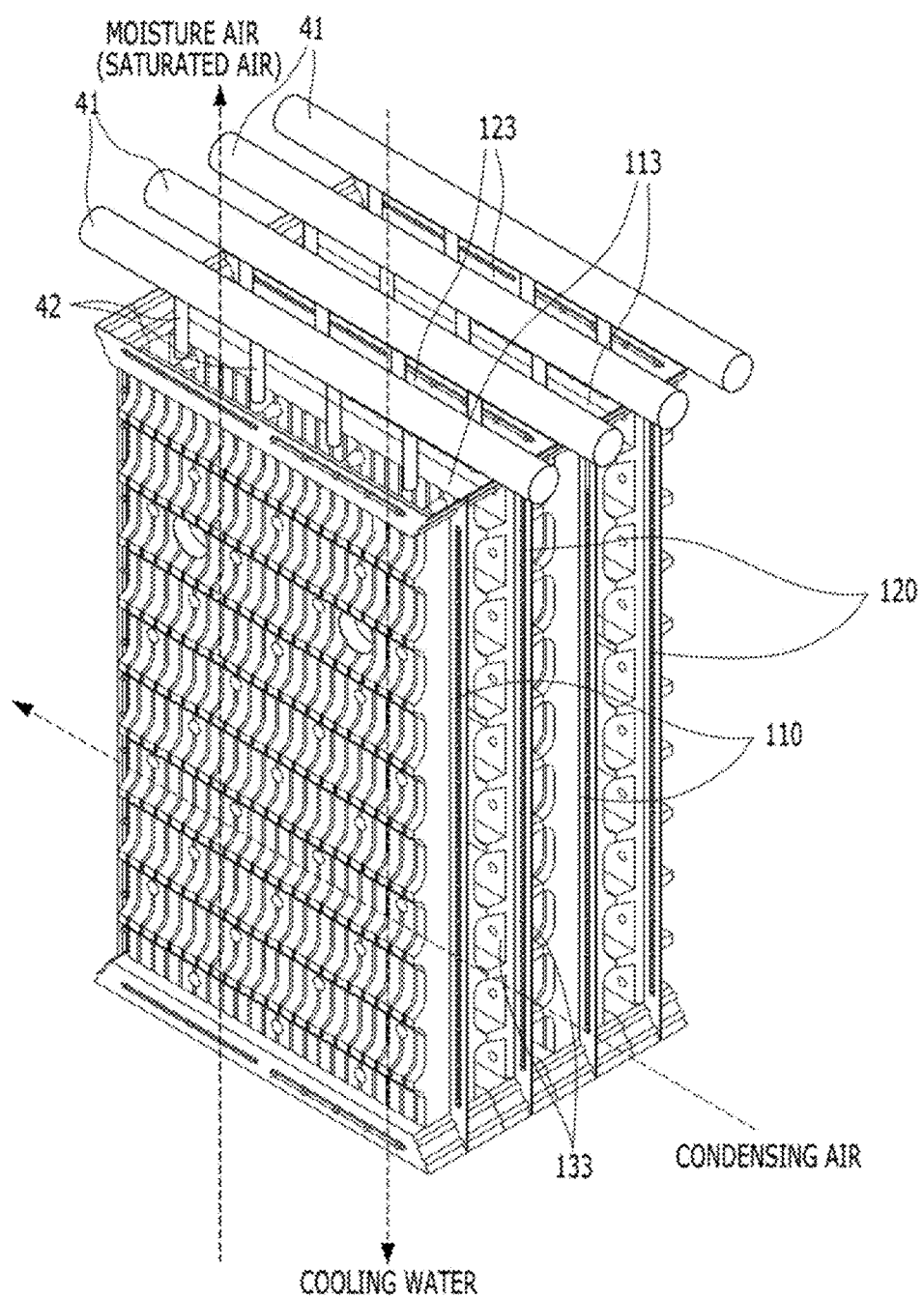
FIG. 13 is a perspective view illustrating the heat exchange-condensation panel assembly in FIG. 12B and a cooling water distribution device arranged in an upper part of the panel assembly.
Figure 14:
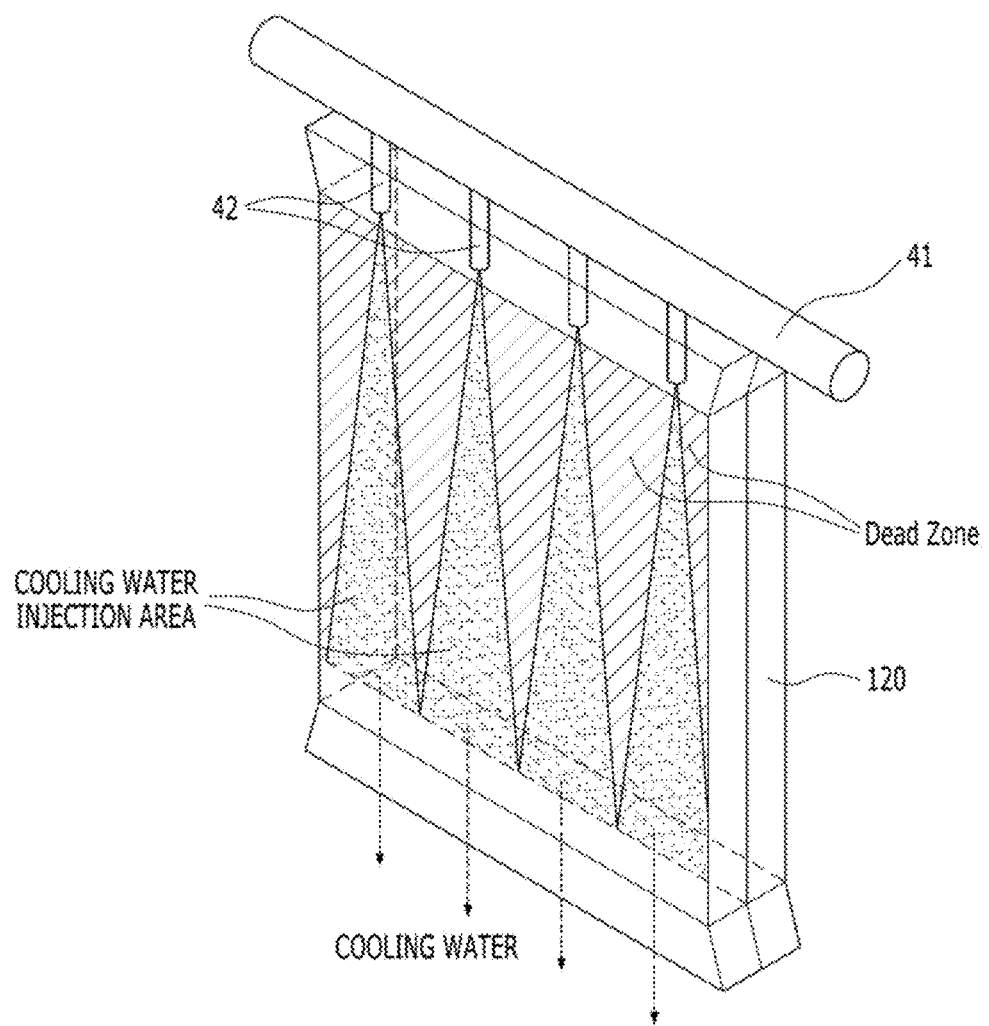
FIG. 14 is a view illustrating the heat exchange-condensation panel assembly and injection areas of the cooling water in the cooling water distribution device of FIG. 13.

Next, a plume abatement and evaporated water recovery apparatus according to another embodiment of the present invention will be described. The plume abatement and evaporated water recovery apparatus may be installed on a cooling tower 300, as shown in FIGS. 12A and 12B.

The cooling tower cools cooling water used for cooling a heat source such as a manufacturing apparatus or air conditioner using the atmospheric air while dropping the cooling water. The cooling tower 300 may be provided with the plume abatement and evaporated water recovery apparatus according to another embodiment of the present invention. The cooling tower 300 may include: a heat exchange-condensation panel assembly 100 including a plurality of moisture air flow passages 113, a plurality of cooling water flow passages 123 and a plurality of condensing air flow passages 133 wherein the moisture air flow passage 113 is arranged adjacently to the condensing air flow passage 133 so that a moisture air that passes through the moisture air flow passage 113 is condensed by a condensing air that passes through the condensing air flow passage 133, and the cooling water flow passage 123 is arranged adjacently to the condensing air flow passage 133 so that a cooling water that passes through the cooling water flow passage 123 is cooled by the condensing air that passes through the condensing air flow passage 133; a first cooling water distribution means that is arranged an upper part of the heat exchange-condensation panel assembly 100 and distributes a part of the cooling water to be cooled into the inlet of the cooling water flow passage 123 of the heat exchange-condensation panel assembly 100; a filler 33 that is arranged a lower part of the heat exchange-condensation panel assembly 100 and allows the cooling water to be heat-exchanged with the air which is induced from cooling air inlet 32; and a second cooling water distribution means that is arranged between a lower part of the heat exchange-condensation panel assembly 100 and an upper part of the filler 33, and distributes the remaining cooling water over the filler except for the cooling water distributed by the first cooling water distribution. The first cooling water distribution means may include a plurality of cooling water discharging tubes 41 and a plurality of injection nozzles 42.

The plurality of injection nozzles 42 of the first cooling water distribution means may be arranged on inlets of a plurality of cooling water flow passages 123 of the heat exchange-condensation panel assembly 100, respectively, wherein each injection nozzle may be formed as a hollow circular nozzle such that the cooling water may be flowed along a wall of the cooling water flow passage 123. Here, the injection nozzle 42 has to be arranged such that the cooling water injected over the cooling water flow passage 123 is not to be splashed out. For example, the injection nozzle 42 may be a Cone Spiral nozzle having an injection angle of 60°.

Preferably, protrusions of reversed-V shapes in wave forms may be zigzagged repeatedly formed on the inner walls of the cooling water flow passage 123 in order to increase contact area with the cooling water and prolong contact time period. Further, the filler 33 may be provided with a plurality of fine passages through which water and air can be passed.

A condensing air inlet 31, through which the atmospheric air is introduced, may be provided an upper part of the second cooling water distribution means wherein the heat exchange-condensation panel assembly 100 according to an embodiment of the present invention may be installed on an inner part of the condensing air inlet 31. The heat exchange-condensation panel assembly 100 may be installed such that the condensing air flow passage 133 is communicated with the condensing air inlet 31, the moisture air flow passage 113 is directed toward the filler 33, and the cooling water flow passage 123 is directed toward the first cooling water distribution means. That is, the condensing air flow passage 133 may be arranged horizontally, and the moisture air flow passage 113 and the cooling water flow passage 123 may be arranged vertically. Here, a fan 35 may be arranged over the heat exchange-condensation panel assembly 100 for transferring and discharging gas.

In the cooling tower 300 as described-above, the atmospheric air may be introduced to an inside of the cooling tower through the cooling air inlet 32 at a lower part thereof by means of an operation of the fan 35, and the introduced air passes through the filler 33 and then may be discharged outside through an outlet at an upper part thereof. At the same time, the cooling water discharged from the first cooling water distribution means may be flowed downward through the cooling water flow passage 123 of the heat exchange-condensation panel assembly 100. As shown in FIGS. 6 and 7, the condensing air flow passages 133 may be arranged on both sides of the moisture air flow passage 113 and on both sides of the cooling water flow passage 123, respectively.

In the plume abatement and evaporated water recovery apparatus according to an embodiment of the present invention, the heat exchange-condensation panel assemblies 100 may be arranged on both sides of the plume abatement and evaporated water recovery apparatus, respectively, to occupy about ⅔ of internal area of the apparatus wherein a space portion may be formed on an internal center thereof, about ⅔ of a total amount of cooling water to be cooled may be distributed to the cooling water flow passage 123 of the heat exchange-condensation panel assembly 100 through the first cooling water distribution means, and about ⅓ of a total amount of cooling water to be cooled may be distributed to the filler 33 through the second cooling water distribution means.

In the plume abatement and evaporated water recovery apparatus according to an embodiment of the present invention, an eliminator 71 may be arranged over the first cooling water distribution means. The eliminator 71 may be arranged to be inclined upwardly from both sides of the plume abatement and evaporated water recovery apparatus toward an upper center thereof so that the air passing through the moisture air flow passage 113 flows toward the upper center of the cooling tower 300 to be mixed efficiently with the atmospheric air passing through the condensing air flow passage 133.

Furthermore, the panel assembly 110 of the moisture air flow passage of the heat exchange-condensation panel assembly 100 according to the present invention, may be formed by coupling a pair of panels 110A, 110B such that the protruding portions 118 formed on inside of the pair of panels 110A, 110B, respectively, are adhered together to form a space between the pair of panels. Here, as shown in FIG. 8, the coupling portion 145 formed on the panel 110B may be inserted into the insertion groove 146c formed on the panel 110A and the coupling portion 146 of the panel 110B may be inserted into the insertion groove 145c of the panel 110A, respectively, to fabricate simply and rapidly the panel assembly 110 of the moisture air flow passage. Furthermore, fixing protrusions 141a, 142a, 143a, 144a, 145a, 146a may be provided on the respective coupling portions 141, 142, 143, 144, 145, 146 at a predetermined distance, and further fixing grooves 141b, 142b, 143b, 144b, 145b, 146b may be formed on rear surfaces of the fixing protrusions. As a result, as shown in FIG. 8, the fixing protrusion 146a of the panel 110B may be inserted into the fixing groove 145b of the panel 110A, and the fixing protrusion 145a of the panel 110B may be inserted into the fixing groove 146b of the panel 110A for insertion coupling, respectively, to keep firmly a coupling state of the fabricated panels 110A, 110B, thereby improving convenience of assembling/installing the panels and durability thereof. Further, the coupling portions 141, 142, 143, 144, 145, 146 formed in the opposed directions may be provided at symmetrical locations of the panels 110A, 110B, respectively, and the panels 110A, 110B having same form can be coupled to a facing direction thereof thereby mass-manufacturing the panel assembly at low cost using a single mold and improving convenience of product management through simplifying items of the product.

Furthermore, the panel assembly 120 of the cooling water flow passage of the heat exchange-condensation panel assembly 100 according to the present invention, may be formed by coupling a pair of panels 120A, 120B such that the protruding portions 218 formed on inside of the pair of panels 120A, 120B, respectively, may be adhered together to form a space between the pair of panels. Here, similarly to a fabricating of the panel assembly 110 of the moisture air flow passage, as shown in FIG. 10, the coupling portion 245 formed on the panel 120B may be inserted into the insertion groove 246c formed on the panel 120A and the coupling portion 246 of the panel 120B may be inserted into the insertion groove 245c of the panel 120A, respectively, to fabricate simply and rapidly the panel assembly 120 of the moisture air flow passage. Fixing protrusions 241a, 242a, 243a, 244a, 245a, 246a may be provided on the respective coupling portions 241, 242, 243, 244, 245, 246 at a predetermined distance, and further fixing grooves 241b, 242b, 243b, 244b, 245b, 246b may be formed on rear surfaces of the fixing protrusions. As a result, as shown in FIG. 10, the fixing protrusion 246a of the panel 210B may be inserted into the fixing groove 245b of the panel 210A, and the fixing protrusion 245a of the panel 120B may be inserted into the fixing groove 246b of the panel 120A for insertion coupling, respectively, to keep firmly a coupling state of the fabricated panels 120A, 120B thereby improving convenience of assembling/installing the panels and durability thereof. Further, the coupling portions 241, 242, 243, 244, 245, 246 formed in the opposed directions may be provided at symmetrical locations of the panels 120A, 120B, respectively, and the panels 120A, 120B having same form can be coupled to a facing direction thereof thereby mass-manufacturing the panel assembly at low cost using a single mold.

Furthermore, the condensing air flow passage 133 of the heat exchange-condensation panel assembly 100 according to the present invention may be formed by coupling the panel assembly 110 and the panel assembly 120 such that the conduit elements 110a, 110b on the panel assembly 110 may be faced to the conduit elements 120a, 120b on the panel assembly 120. In this case, as shown in FIGS. 4A, 4B, 4C, the coupling portions 141, 143 of one panel 110B of the panel assembly 110 may be inserted into the insertion grooves 242c, 244c of one panel 120A of the panel assembly 120, respectively, and the coupling portions 241, 243 of one panel 120A of the panel assembly 120 may be inserted into the insertion grooves 142c, 144c of one panel 110B of the panel assembly 110, respectively.

Next, an operation of the plume abatement and evaporated water recovery apparatus according to an embodiment of the present invention will be described.

As shown in FIGS. 6 and 7, since the condensing air flow passages 133 are arranged on both sides of the moisture air flow passage 113 of the heat exchange-condensation panel assembly 100 of the plume abatement and evaporated water recovery apparatus according to an embodiment of the present invention, the moisture air of a high temperature flowing through the moisture air flow passage 113 may be in indirect contact with the atmospheric air, i.e., the condensing air that flows through the condensing air flow passage 133. As a result, the condensing air flowing through the condensing air flow passage 133 absorbs heat of the moisture air flowing through the moisture air flow passage 113 to condense water vapor. Additionally, as shown in FIGS. 6 and 7, since the condensing air flow passages 133 are arranged on both sides of the cooling water flow passage 123, the cooling water of a high temperature flowing through the cooling water flow passage 123 may be in indirect contact with the atmospheric air, i.e., the condensing air flowing through the condensing air flow passage 133. As a result, the condensing air flowing through the condensing air flow passage 133 absorbs heat of the cooling water of a high temperature flowing through the cooling water flow passage 123 so that the temperature of the condensing air becomes closer to that of the cooling water. Furthermore, the temperature of the atmospheric air that passes through the condensing air flow passage 133 while heat-exchanging with the cooling water is increased to be closer to the temperature of the cooling water so that the temperature difference between the air and the moisture air passing through the moisture air flow passage 113 is reduced thereby obtaining plume abatement effect significantly. Even though the air discharged into an outside of the cooling tower 30 is discharged into the atmosphere while its temperature and humidity are lowered greatly, a plume phenomenon does not occur and further the water condensed through the heat exchange-condensation panel assembly 100 is accumulated inside the cooling tower 30 to be reused as cooling water.

In the plume abatement and evaporated water recovery apparatus according to an embodiment of the present invention, the heat exchange-condensation panel assemblies 100 may be arranged on both sides of the plume abatement and evaporated water recovery apparatus to occupy about ⅔ of internal area of the apparatus wherein a space portion may be formed on an internal center thereof, about ⅔ of a total amount of cooling water to be cooled may be distributed to the cooling water flow passage 123 of the heat exchange-condensation panel assembly 100 through the first cooling water distribution means, and about ⅓ of a total amount of cooling water to be cooled may be distributed to the filler 33 through the second cooling water distribution means. Under this configuration, when about ⅔ of a total amount of the cooling water to be cooled may be passed through the cooling water flow passage 123 of the heat exchange-condensation panel assembly 100 and then through the filler 33, and the rest of the cooling water (about ⅓ of a total amount of cooling water) may be injected directly over the filler, about 20% of a total heat removal amount of the cooling water to be cooled may be removed in the heat exchange-condensation panel assembly 100, and the rest heat removal amount of the cooling water to be cooled (about 80% of a total heat removal amount) may be removed in the filler 33. As described-above, the temperature of the cooling water may be decreased due to an indirect contact with the condensing air to reduce evaporation amount of the cooling water to about 20% or so in the filler 33 thereby decreasing loss of the cooling water produced from evaporation. The heat exchange between the cooling water and the condensing air in the heat exchange-condensation panel assembly 100 is sensible heat exchange, and thus evaporation does not occur.

Furthermore, in the plume abatement and evaporated water recovery apparatus according to an embodiment of the present invention, as shown in FIG. 12A, an eliminator 71 may be arranged on an internal upper part of a cooling tower 300 to be inclined so that a moisture air that passes through a moisture air flow passage 113 of the heat exchange-condensation panel assembly 100 may be guided to a central upper region (B' region) of an inner side of the cooling tower 300 and thus may be mixed efficiently with the atmospheric air that is heated at a low humidity thereby increasing plume abatement effect.

Moreover, in the plume abatement and evaporated water recovery apparatus according to an embodiment of the present invention, the apparatus can be operated efficiently depending on temperature changes at surroundings. In summer season, the plume may not be generated since a temperature of the atmospheric air is high, and further heat transmission from the cooling water that passes through the cooling water flow passage 123 to the atmospheric air that passes through the condensing air flow passage 133 becomes smaller, and thus the cooling water may be injected to the moisture air flow passage 113 through the first cooling water distribution means in order to increase the cooling effect of the cooling water in the heat exchange-condensation panel assembly 100 so that the moisture air is to be in direct contact with the cooling water within the moisture air flow passage 113 to cool the cooling water thereby increasing a cooling effect. As described-above, when the cooling water is cooled additionally in the moisture air flow passage 113 in summer season, about 20% of a total evaporation amount in the filler 33 may be reduced even in summer season to decrease cooling water loss due to evaporation. In winter season, a temperature of the atmospheric air is low and thus the cooling water passing through the cooling water flow passage 123 may be cooled sufficiently only by the atmospheric air passing through the condensing air flow passage 133.

Next, referring to FIGS. 6, 7, 12A and 12B, a method of abating plume and recovering evaporated water according to another embodiment of the present invention will be described.

According to another embodiment of the present invention, the method of abating the plume and recovering evaporated water by condensing moisture contained in the moisture air (for example, here, the moisture air may be a saturated air containing maximum amount of moisture that it can hold at particular temperature) and abating the plume through heat exchange of the moisture air and the cooling water with the atmospheric air by using a cooling tower 300 including a wet portion at a lower part and a dry portion at an upper part wherein a filler 33 is arranged on the wet portion at a lower part, wherein a fan 35 is arranged on the upper part, and wherein the heat exchange-condensation panel assembly 100 which is provided with a plurality of moisture air flow passages 113 through which moisture air flows, a plurality of cooling water flow passages 123 through which cooling water flows and a plurality of condensing air flow passages 133 through which the atmospheric air (condensing air) flows, on the dry portion at an upper part, may include: a first cooling water distribution step of distributing a part of the cooling water to be cooled to the cooling water flow passage 123 of the heat exchange-condensation panel assembly 100 arranged on the drying portion at an upper part of the cooling tower 300; a second cooling water distribution step of distributing the rest of the cooling water to be cooled to the filler 33 arranged on the wet portion at a lower part of the cooling tower 300; a step of inflowing moisture air into the wet portion at a lower part of the cooling tower 300; a step of heat-exchanging the moisture air with the cooling water in the filler 33; a step of inflowing the atmospheric air into the condensing air flow passage 133 of the heat exchange-condensation panel assembly 100; a step of condensing the moisture air and cooling the cooling water by heat-exchanging the moisture air and the cooling water with the condensing air in the heat exchange-condensation panel assembly 100; and a step of mixing the atmospheric air having a temperature of which is increased by heat-exchanging with both the moisture air and the cooling water, with the moisture air condensed by the atmospheric air.

According to the method of abating plume and recovering evaporated water, the cooling water that flows downward by gravity through the cooling water flow passage 123 may be cooled by indirect contact with the atmospheric air that flows horizontally through the condensing air flow passage 133 while condensing the moisture air that flows upward vertically through the moisture air flow passage by the atmospheric air that flows horizontally through the condensing air flow passage so that evaporated amount of the cooling water produced in the filler may be reduced and the temperature of the condensing air may be increased efficiently by heat-exchanging with the cooling water and the moisture air through indirect contact therewith and thus the condensing air may become a low humid state thereby improving the performance of plume abatement and recovering efficiently evaporated water.

In the method of abating plume and recovering evaporated water, about ⅔ of a total amount of the cooling water may be distributed in the first cooling water distribution step, and the rest of the cooling water may be distributed in the second cooling water distribution step.

Furthermore, in the method of abating plume and recovering evaporated water, the cooling water may be distributed to the cooling water flow passage and the moisture air flow passage in the first cooling water distribution step. According to the method, in summer season when the plume is not produced, the cooling water may flow through the cooling water flow passage and the moisture air flow passage to cool the cooling water by the moisture air of a temperature lower than the cooling water thereby increasing cooling effect.

A cooling water distribution device according to the present invention may be installed on a plume abatement and evaporated water recovery apparatus including: the heat exchange-condensation panel assemblies 100 to be coupled to form a plurality of moisture air flow passages 113 through which moisture air flows, a plurality of cooling water flow passages 123 through which cooling water flows and a plurality of condensing air flow passages 133 through which condensing air (the atmospheric air) that is introduced to a condensing air inlet 31 flows; a cooling water distribution means that is arranged on an upper part of the heat exchange-condensation panel assembly 100 and distributes a part of the cooling water to be cooled to the inlet of the cooling water flow passage 123 of the heat exchange-condensation panel assembly 100; a filler 33 that is arranged on a lower part of the heat exchange-condensation panel assembly 100 and heat-exchanges the cooling water with the air that is introduced into the cooling air inlet 32; and a second cooling water distribution means that is arranged between a lower part of the heat exchange-condensation panel assembly 100 and an upper part of the filler 33 and distributes the rest of the cooling water to be cooled except for the cooling water distributed through the cooling water distribution device over the filler wherein streams of the cooling water distributed to the cooling water flow passage 123 and/or the moisture air flow passage 113 of the heat exchange-condensation panel assembly 100 may be formed without a dead zone, and thus heat exchange efficiency between the cooling water and the condensing air and between the cooling water and the moisture air in the heat exchange-condensation panel assembly 100 is improved thereby improving the performance of plume abatement and recovering efficiently the evaporated water. The moisture air may contain water that is evaporated with heat and also produced by a chemical reaction, and may be various gases containing other components in addition to water.

Figure 15:
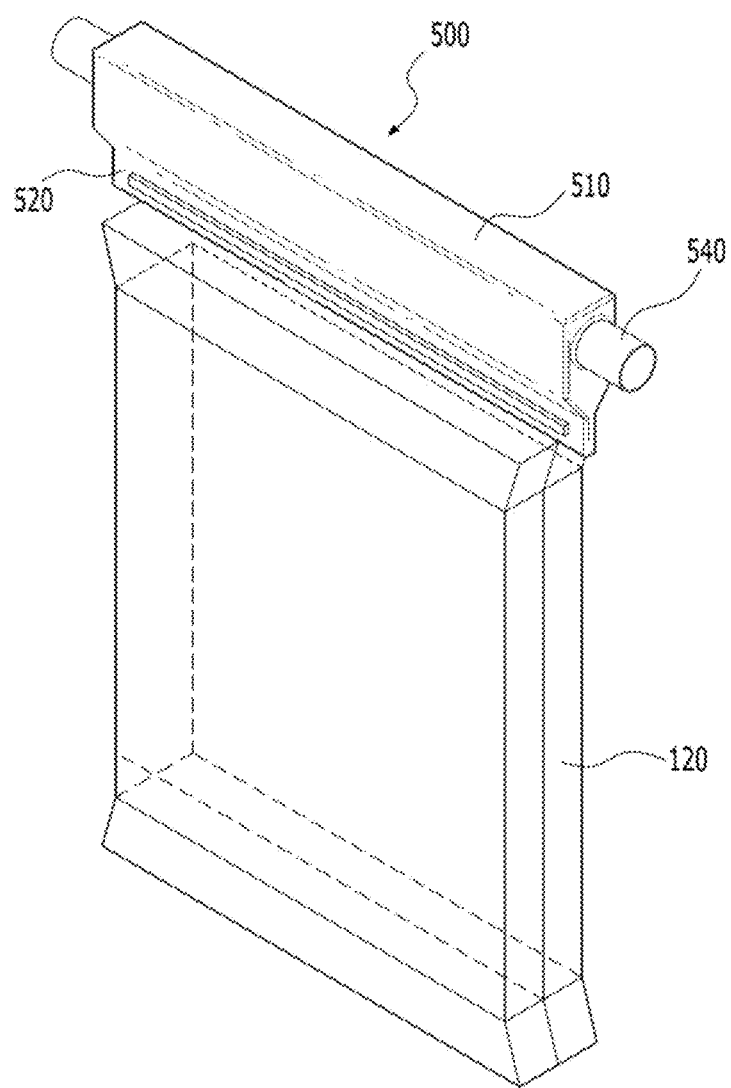
FIG. 15 is a view illustrating the cooling water distribution device arranged in an upper part of the heat exchange-condensation panel assembly according to an exemplary embodiment of the present invention.
Figure 16:
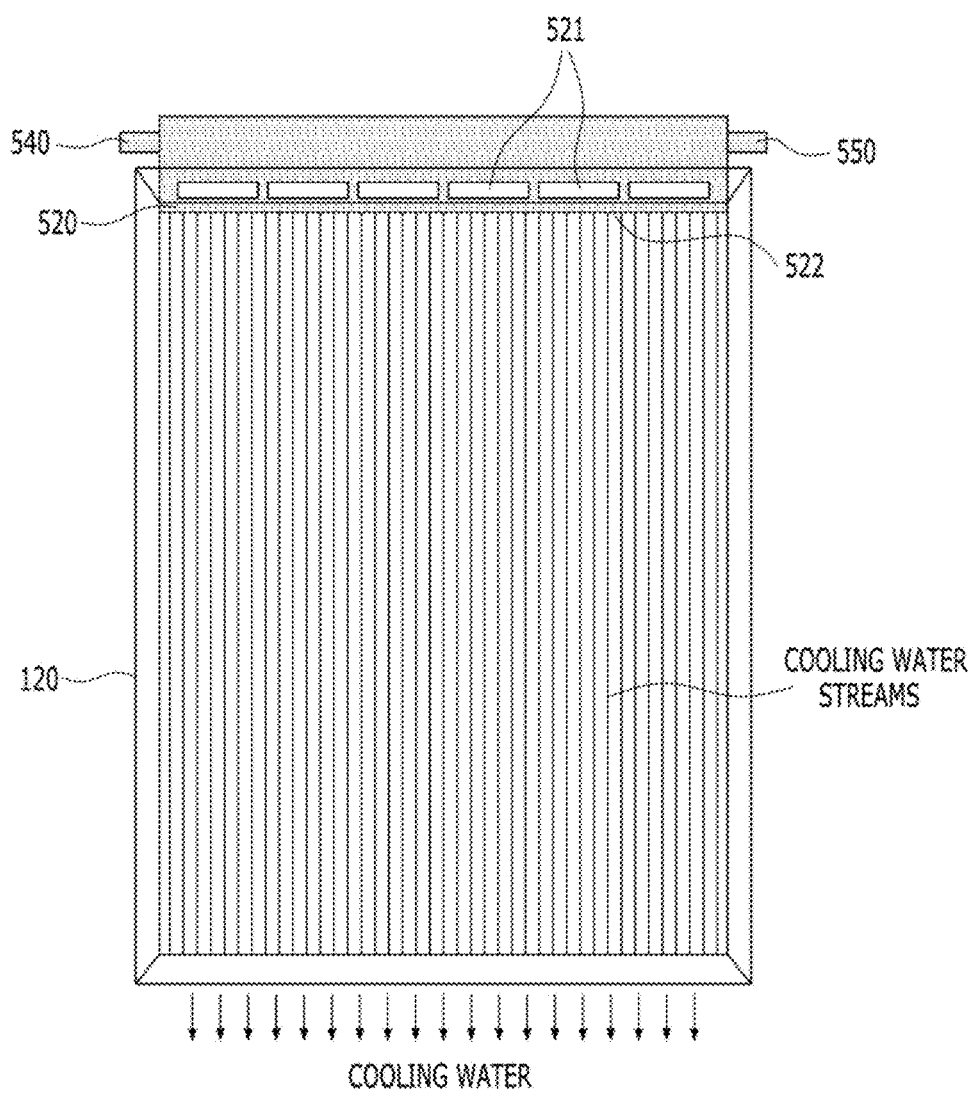
FIG. 16 is a view illustrating streams of the cooling water in the cooling water distribution device and the heat exchange-condensation panel assembly of FIG. 15.
Figure 17:
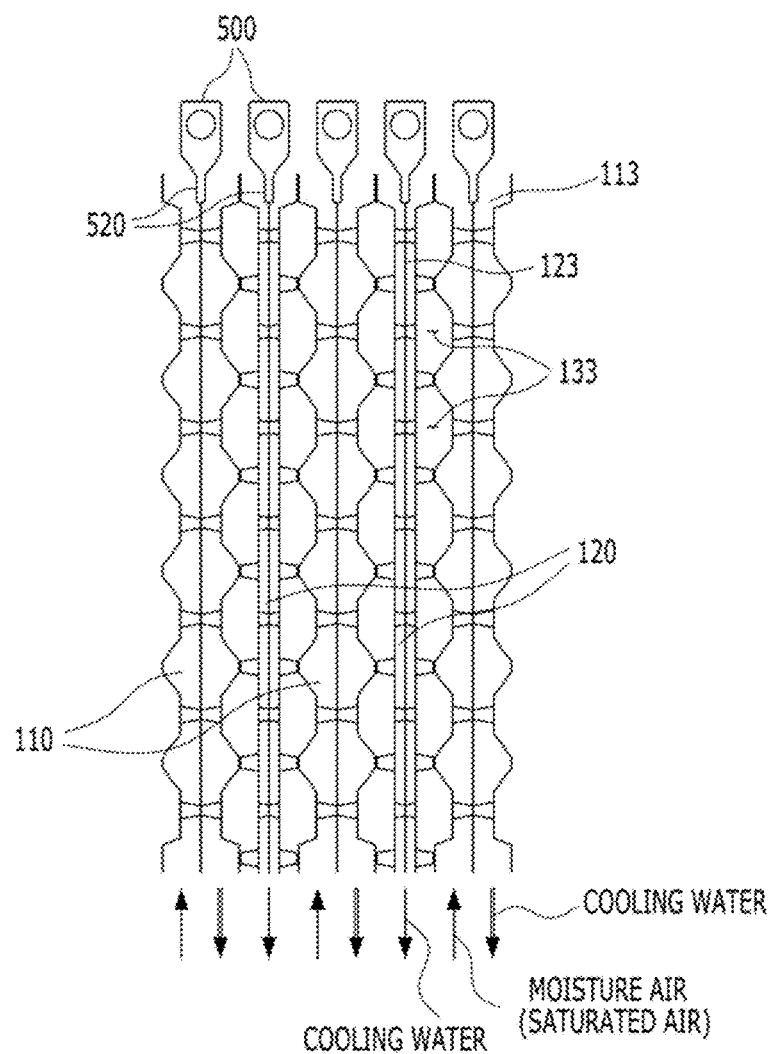
FIG. 17 is a side-sectional view illustrating the cooling distribution device arranged in an upper part of the heat exchange-condensation panel assembly according to an exemplary embodiment of the preset invention.
Figure 18:
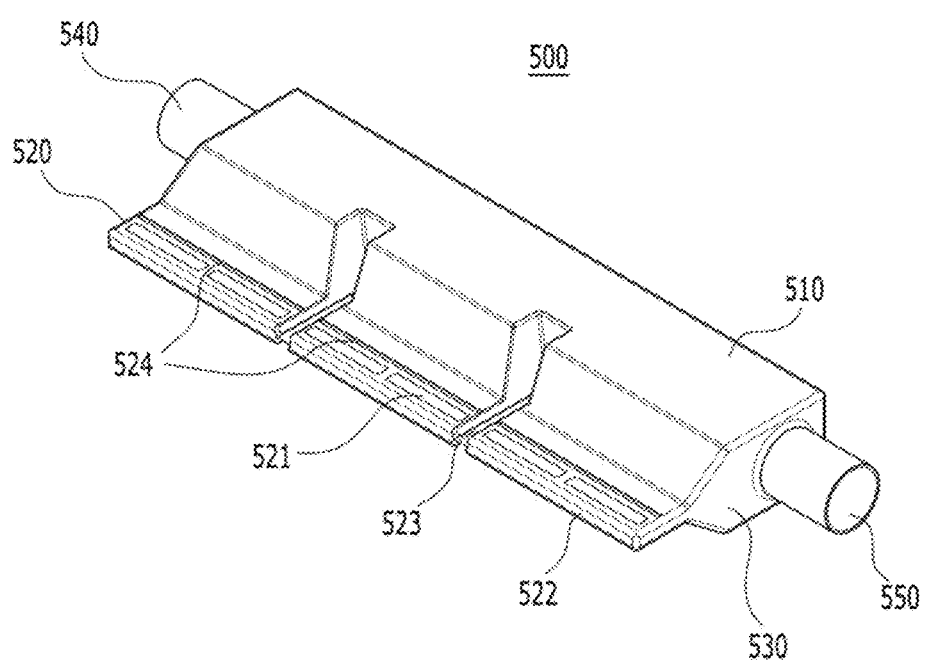
FIG. 18 is a perspective view illustrating the cooling water distribution device according to an exemplary embodiment of the present invention.

FIG. 15 is a view illustrating the cooling water distribution device 500 arranged on the cooling water flow passage 123 formed in the panel assembly 120 of the heat exchange-condensation panel assembly 100 according to an exemplary embodiment of the present invention, FIG. 16 is a view illustrating streams of the cooling water in the cooling water distribution device 500 and the heat exchange-condensation panel assembly 100, FIG. 17 is a side-sectional view illustrating the cooling distribution device 500 arranged in an upper part of the heat exchange-condensation panel assembly 100 according to an exemplary embodiment of the preset invention, and FIG. 18 is a perspective view illustrating the cooling water distribution device 500 according to an exemplary embodiment of the present invention.

In the heat exchange-condensation panel assembly 100, the condensing air flow passages 133 may be arranged on both sides of the moisture air flow passage 113 and the condensing air flow passages 133 may be also arranged on both sides of the cooling water flow passage 123. Thus, the moisture air flow passage 113, the condensing air flow passage 133, the cooling water flow passage 123, the condensing air flow passage 133, and the moisture air flow passage 113 may be arranged sequentially in order.

A panel assembly 110 of the moisture air flow passage of the heat exchange-condensation panel assembly 100 may be formed entirely as a generally rectangular plate shape wherein a pair of panels each having a protruding portion (not shown) in its inside are coupled each other to form a space of the moisture air flow passage 113. The moisture air flow passage 113 forms a passage where an inlet at a lower part and an outlet at an upper part are opened and other parts are shielded from an outside.

A panel assembly 120 of the cooling water flow passage of the heat exchange-condensation panel assembly 100 may be formed entirely as a generally rectangular plate shape wherein a pair of panels each having a protruding portion (not shown) in its inside are coupled each other to form a space of the moisture air flow passage 123. Here, protrusions (not shown) of reversed-V shapes in wave forms may be zigzagged repeatedly formed on the inner surfaces of the panels constituting the panel assembly 120 of the cooling water flow passage 123 in order to increase contact area with the cooling water and prolong contact time period. The cooling water flow passage 123 forms a passage where an inlet at a lower part and an outlet at an upper part are opened and other parts are shielded from the outside.

A condensing air flow passage 133 in the heat exchange-condensation panel assembly 100 may be formed by adhering the coupling portion of the panel assembly 110 of the moisture air flow passage and the coupling portion of the panel assembly 120 of the cooling water flow passage such that an outer surface of the panel assembly 110 is faced to an outer surface of the panel assembly 120.

Here, the condensing air flow passage 133 and the moisture air flow passage 113 may be formed such that a flow of the condensing air is intersected to a flow of the moisture air. Further, the condensing air flow passage 133 and the cooling water flow passage 123 may be formed such that a flow of the condensing air is intersected to a flow of the cooling water.

FIG. 17 is a side-sectional view illustrating the cooling distribution device 500 arranged in an upper part of the heat exchange-condensation panel assembly 100 according to an exemplary embodiment of the present invention wherein a plurality of cooling water distribution devices of the present invention may be arranged on an upper part of the heat exchange-condensation panel assembly 100.

Figure 19:
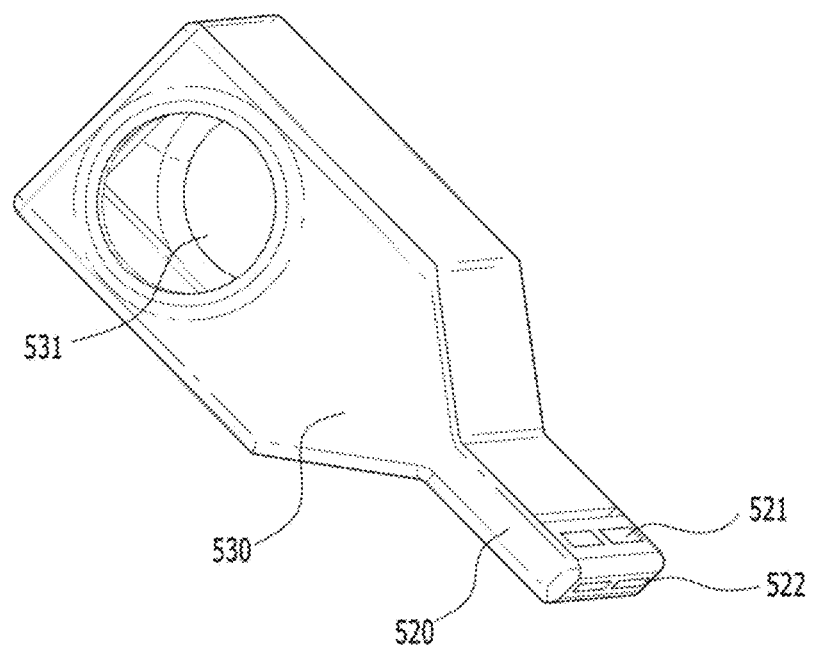
FIG. 19 is a partly exploded-sectional view illustrating the cooling water distribution device of FIG. 18.

Next, referring FIGS. 18 and 19, a cooling water distribution device 500 will be described.

The cooling water distribution device 500, as shown in FIG. 18, may be provided with a body portion 510 which has a length corresponding to a width of the heat exchange-condensation panel assembly 100 and in which a space for receiving the cooling water is formed. Further, a cooling water inlet 540 may be arranged on one side end of the body portion 510, which is connected with a supply tube of the cooling water. Here, the cooling water distribution device 500 may be made of metal material or synthetic resin such as polytetrafluoroethylene (PTFE). When the cooling water distribution device 500 is fabricated, known methods such as a seam welding, a spot welding or adhering method using an adhering agent, etc., may be used, and thus detailed description thereof is omitted.

A cooling water outlet 550 may be arranged on the other side end 530 of the body portion 510 at an opposing location to the cooling water inlet 540. When the side ends 530 of the plurality of cooling water distribution devices are communicated each other, uniform pressure can be maintained within the cooling water distribution device 500. One cooling water outlet 550 may be communicated with another adjacent cooling water inlet 540. Further, a nozzle portion 520 for injecting the cooling water may be formed along an entire length in a longitudinal direction of the body portion 510 on a lower part of the body portion 510 (a portion toward an upper part of the heat exchange-condensation panel assembly 100). Meanwhile, at least one elongated slit 521 may be formed on both sides of the nozzle portion 520, respectively. Preferably, at least one slit 521 of the nozzle portion 520 may be formed through the entire length in a transverse direction of the cooling water flow passage 123 and the moisture air flow passage 113 of the heat exchange-condensation panel assembly 100. As described-above, since the plurality of elongated slits 521 are formed on both sides of the nozzle portion 520, respectively, the cooling water may be injected toward both internal surfaces of the cooling water flow passage 123 and both internal surfaces of the moisture air flow passage 113 of the heat exchange-condensation panel assembly 100 through the nozzle portion 520 and further the stream of the injected cooling water is formed continuously through the entire length in a transverse direction of the cooling water flow passage 123 and the moisture air flow passage 113. Thus, as shown in FIG. 16, a dead zone where the cooling water does not arrive to may not occur within both the cooling water flow passage 123 and the moisture air flow passage 113 of the heat exchange-condensation panel assembly 100. Meanwhile, at least one slit 522 of the cooling water outlet of the nozzle portion 520 may be formed on a front end of the nozzle portion 520.

When the cooling water distribution device of the present invention is installed within the cooling water flow passage 123 and the moisture air flow passage 113 at an upper part of the heat exchange-condensation panel assembly 100, the body portion 510 of the nozzle portion 520 may be inserted into the cooling water flow passage 123 and the moisture air flow passage 113 with a predetermined depth such that the injected cooling water is scattered to outside at a minimum level.

Further, even though the slits 522 of the front end of the nozzle portion 520 are formed continuously through the entire length in a transverse direction of the cooling water flow passage 123 and the moisture air flow passage 113, at least one adhering portion 523 for reinforcing a strength of the front end of the nozzle portion 520 may be provided in a longitudinal direction of the slits 522. The number of the adhering portion may be selected in a minimum range in which the dead zone is not formed within the cooling water flow passage 123 and the moisture air flow passage 113.

The adhering portion 523 of the nozzle portion 520 may serve to maintain sufficiently an adhering state of the both sides constituting the nozzle portion 520. The adhering portion 523 may be formed by adhering to the both sides of the nozzle portion 520 by using known adhering methods such as a seam welding, a spot welding, a concavo-convex coupling, or an adhering with adhesive, etc.

Reinforcing portions 524 in a longitudinal direction may be formed on both side surfaces of the nozzle portion 520, respectively. The reinforcing portion 524 may be formed such that the both side surfaces constituting the nozzle portion 520 are protruded inwardly or outwardly, or formed with a reinforcement rib formed on an outer surface thereof.

The nozzle portion 520 of the cooling water distribution device 500 according to the present invention may be installed basically within the cooling water flow passage 123 of the heat exchange-condensation panel assembly 100, but it may be arranged additionally within the moisture air flow passage 113 of the heat exchange-condensation panel assembly 100. In this case, the nozzle portion 520 of the cooling water distribution device 500 may be installed within the inlet of the moisture air flow passage 113.

As described-above, when the cooling water distribution device 500 is installed within the moisture air flow passage 113 of the heat exchange-condensation panel assembly 100, the plume abatement and evaporated water recovery apparatus can be operated efficiently in accordance with the temperature changes of air in the surroundings. In summer season, the plume may not be generated since a temperature of the atmospheric air is high, and further heat transmission from the cooling water passing through the cooling water flow passage 123 to the atmospheric air passing through the condensing air flow passage 133 becomes smaller. Thus, in this case, the cooling water is injected to the moisture air flow passage 113 through the first cooling water distribution means in order to increase a cooling mount of the cooling water in the heat exchange-condensation panel assembly 100 so that the moisture air is to be in direct contact with the cooling water within the moisture air flow passage 113 to cool additionally the cooling water thereby increasing a cooling effect. As described-above, when the cooling water is cooled additionally in the moisture air flow passage 113 in summer season, about 20% of a total evaporation amount in the filler 33 is reduced even in summer season to decrease cooling water loss due to evaporation. In winter season, a temperature of the atmospheric air is low and thus the cooling water that passes through the cooling water flow passage 123 is cooled sufficiently only by the atmospheric air that passes through the condensing air flow passage 133.

Figure 20:
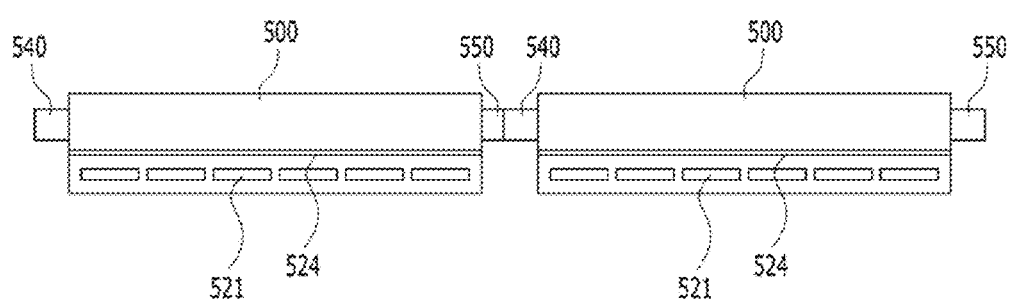
FIG. 20 is a view illustrating a state where a plurality of cooling water distribution devices are arranged in a line and coupled with each other according to an exemplary embodiment of the present invention.

The cooling water distribution device 500 according to the present invention may be installed per the heat exchange-condensation panel assembly 100 wherein when a plurality of heat exchange-condensation panel assemblies are arranged in a line and coupled each other, the number of a plurality of cooling water distribution devices 500 may correspond to that of the heat exchange-condensation panel assemblies 100. FIG. 20 illustrates an arrangement where the plurality of cooling water distribution devices 500 are arranged in a line and coupled with each other. At this time, the outlet 550 of one cooling water distribution device 500 may be coupled to the inlet 540 of another cooling water distribution device 500 in the plurality of cooling water distribution devices 500 arranged in line.

Figure 21:
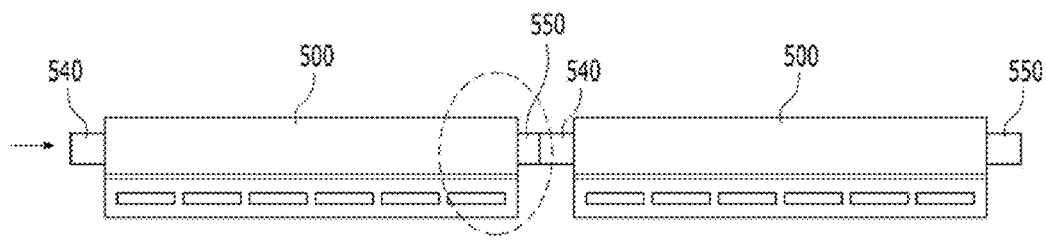
FIG. 21 is a view illustrating a portion where a vortex of the cooling water flow occurs within the respective bodies of the plurality of cooling distribution devices of FIG. 20.
Figure 22:
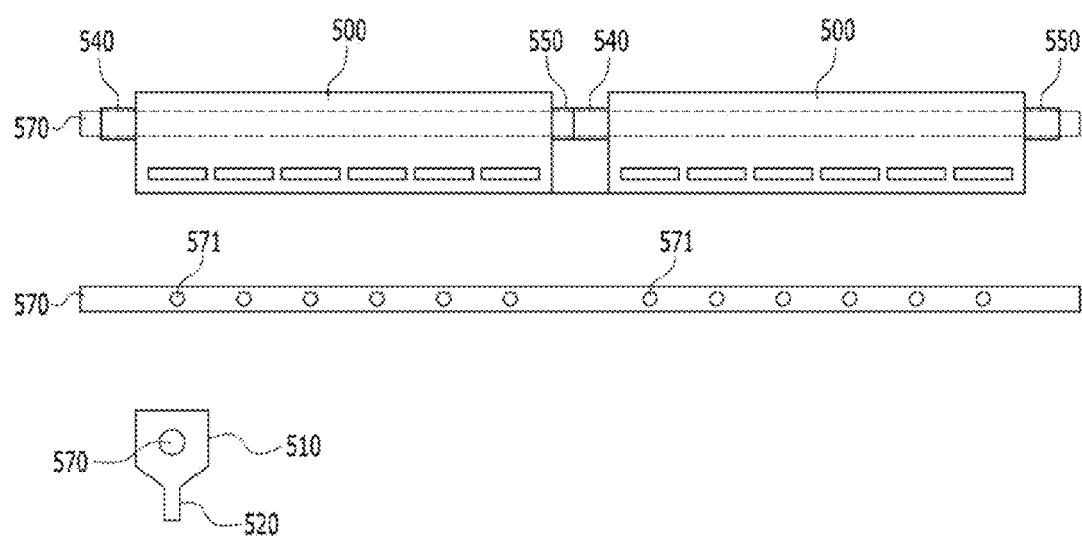
FIG. 22 is a view illustrating a pipe having a plurality of holes, which is arranged within the plurality of cooling water distribution devices of FIG. 20.

In this case, when the cooling water flows from one cooling water distribution device 500 to adjacent another cooling water distribution device 500, a vortex flow may be generated at a place adjacent to the outlet 550 (portion indicated with dotted oval in FIG. 21) within the body portion 510 of the cooling water distribution device 500, disposed in front of the apparatus. Accordingly, as shown in FIG. 22, a pipe 570 may be arranged through the inlets, the body portions and the outlets of the plurality of cooling water distribution devices arranged in a line to transfer smoothly the cooling water between the cooling water distribution devices 500 coupled adjacently without a vortex flow.

Meanwhile, a plurality of apertures 571 may be formed on upper parts of the pipe 570 that is disposed within the body portion 510. Each of the sizes of the plurality of apertures 571 on upper parts of the pipe 570 within the body portion of the cooling water distribution device (i.e., the cooling water distribution device disposed on an upstream side of a cooling water flow) disposed closer to the cooling water supply tube 41 among the plurality of the cooling water distribution devices 500 may be larger than each of the sizes of the plurality of apertures 571 on upper parts of the pipe 570 within the body portion of the cooling water distribution device (i.e., the cooling water distribution device disposed on a downstream side of a cooling water flow) disposed remote from the cooling water supply tube 41. Preferably, the diameters of the apertures 571 on upper parts of the pipe, the former, may be larger by about 2 mm than the diameters of the apertures 571 on upper parts of the pipe, the latter.

The cooling water distribution device 500 according to the present invention may be utilized in the plume abatement and evaporated water recovery apparatus including: a heat exchange-condensation panel assembly 100 to be coupled to form a plurality of moisture air flow passages 113 through which moisture air flows, a plurality of cooling water flow passages 123 through which cooling water flows and a plurality of condensing air flow passages 133; a cooling water distribution means that is arranged on an upper part of the heat exchange-condensation panel assembly 100 and distributes a part of the cooling water to be cooled to the inlet of the cooling water flow passage 123 of the heat exchange-condensation panel assembly 100; a filler 33 that is arranged on a lower part of the heat exchange-condensation panel assembly 100 and heat-exchanges the cooling water with the air that is introduced into the cooling air inlet 32; and a second cooling water distribution means that is arranged between a lower part of the heat exchange-condensation panel assembly 100 and an upper part of the filler 33 and distributes the rest of the cooling water over the filler except for the cooling water distributed through the previous mentioned cooling water distribution device.

In this case, a configuration of the cooling water distribution device 500 according to the present invention is similar to the configuration as described-above, and thus the detailed description thereof is omitted.

Next, an operation of the cooling water distribution device 500 according to an embodiment of the present invention will be described.

According to the present invention, since the nozzle portion 520 as a cooling water injection port of the cooling water distribution device 500 is formed with a plurality of slits 521 that are opened continuously toward a transverse direction of the heat exchange-condensation panel assembly 100, the streams of the cooling water to be injected into the cooling water flow passage 123 and the moisture air flow passage 113 of the heat exchange-condensation panel assembly 100 through the nozzle portion 520 of the cooling water distribution device 500 are not interrupted but continued and thus a dead zone where the cooling water does not arrive to is prevented from occurring within the cooling water flow passage 123 and the moisture air flow passage 113 of the heat exchange-condensation panel assembly 100.

Accordingly, when the cooling water distribution device 500 is applied to the plume abatement and evaporated water recovery apparatus using the heat exchange-condensation panel assembly 100 provided with a plurality of moisture air flow passage 113, a plurality of cooling water flow passage 123 and a plurality of condensing air flow passage 133, the streams of the cooling water to be distributed to the cooling water flow passage 123 and/or the moisture air flow passage 113 of the heat exchange-condensation panel assembly 100 may be formed without the dead zone and thus heat exchange efficiency between the cooling water and the condensing air and between the cooling water and the moisture air is increased thereby improving the performance of the plume abatement and recovering efficiently the evaporated water.

FIG. 20 shows a state where a plurality of cooling water distribution devices 500 are arranged in a line and coupled each other wherein an outlet 550 of one cooling water distribution device 500 is coupled to an inlet 540 of another cooling water distribution device 500 in the plurality of cooling water distribution devices 500 arranged in a line. In this case, as shown in FIG. 22, the pipe 570 may be arranged through the inlet 540, the body portion 510 and the outlet 550 of each of the plurality of cooling water distribution devices 500 arranged in a line to transfer the cooling water through its internal part, and when a plurality of apertures 571 are formed on upper parts of the pipe 570 disposed inside the body portion 510, a vortex flow is prevented from being generated at a place adjacent to the outlet 550 (portion indicated with dotted oval in FIG. 21) within the body portion 510 of the cooling water distribution device 500 disposed in front of the apparatus to transfer smoothly the cooling water between adjacently coupled cooling water distribution devices.

The invention has been described in detail with reference to preferred embodiments thereof. However, it will be appreciated by one skilled in the art that various changes, modifications and extensions may be made to these embodiments without departing from the principles and spirit of the invention, the scope of which is defined in the appended claims and their equivalents.

The invention claimed is:

1. A heat exchange-condensation panel assembly coupled to form a plurality of moisture air flow passages which are arranged on a discharging passage of a gas containing vapor (moisture air) and through which the moisture air flows; a plurality of cooling water flow passages through which the cooling water flows; and a plurality of condensing air flow passages through which the condensing air flows, comprising:

a panel assembly (110) of the moisture air flow passage provided with a pair of panels (110A, 110B) wherein protruding portions (118) formed on inner surfaces of the panels, respectively, are adhered to each other to form the moisture air flow passage (113) therein, and a plurality of conduit elements (110a, 110b) each of which is recessed on outer surfaces of the pair of panels (110A, 110B) and a plurality of connecting portions (114), each of which protrudes outside, are provided in side-by-side parallel; and a panel assembly (120) of the cooling water flow passage provided with a pair of panels (120A, 120B) wherein protruding portions (218) formed on inner surfaces of the panels, respectively, are adhered to each other to form the cooling water flow passage (123) therein, and a plurality of conduit elements (120a, 120b) each of which is recessed on outer surfaces of the pair of panels (120A, 120B) and a plurality of connecting portions (214), each of which protrudes outside, are provided in side-by-side parallel, wherein a plurality of condensing air flow passages (133), each of which is in a conduit shape, are formed in side-by-side parallel by adhering together the connecting portions (114) of the panel assembly (110) of the moisture air flow passage and the connecting portions (214) of the panel assembly (120) of the cooling water flow passage in such a manner that the conduit elements (110a, 110b) of the panel assembly (110) of the moisture air flow passage are faced to the conduit elements (120a, 120b) of the panel assembly (120) of the cooling water flow passage.

2. The heat exchange-condensation panel assembly according to claim 1, wherein the panel assembly (110) of the moisture air flow passage is provided with a coupling portion (145) protruded forward, a coupling portion (146) protruded rearward, and insertion grooves (145c, 146c) formed on rear surfaces of the coupling portions (145, 146), respectively, so that the coupling portion (145) of the panel (110B) is inserted into the insertion groove (146c) of the panel (110A) and the coupling portion (146) of the panel (110B) is inserted into the insertion groove (145c) of the panel (110A) for coupling them, respectively;

the panel assembly (120) of the cooling water flow passage is provided with a coupling portion (245) protruded forward, a coupling portion (246) protruded rearward, and insertion grooves (245c, 246c) formed on rear surfaces of the coupling portions (245, 246), respectively, so that the coupling portion (245) of the panel (120B) is inserted into the insertion groove (246c) of the panel (120A) and the coupling portion (246) of the panel (120B) is inserted into the insertion groove (245c) of the panel (120A) for coupling them, respectively;

the coupling portions (141, 143) of one panel (110B) of the panel assembly (110) of the moisture air flow passage are inserted into the insertion grooves (242c, 244c) of one panel (120A) of the panel assembly (120) of the cooling water flow passage, respectively, and the coupling portions (241, 243) of one panel (120A) of the panel assembly (120) of the cooling water flow passage are inserted into the insertion grooves (142c, 144c) of one panel (110B) of the panel assembly (110) of the moisture air flow passage, respectively.

3. The heat exchange-condensation panel assembly according to claim 2, wherein the plurality of coupling portions (141, 142, 143, 144) of the panels (110A, 110B) of the panel assembly (110) of the moisture air flow passage are provided as a pair at symmetrical locations of the respective panels (110A, 110B) and the paired coupling portions (141, 142, 143, 144) of both panels protrude in opposed directions, respectively, and the insertion grooves (141c, 142c, 143c, 144c) are formed on rear surfaces of said coupling portions (141, 142, 143, 144); and wherein the plurality of coupling portions (241, 242, 243, 244) of the panels (120A, 120B) of the panel assembly (120) of the cooling water flow passage are provided as a pair at symmetrical locations of the respective panels (120A, 120B) and the paired coupling portions (241, 242, 243, 244) of the respective panels (120A, 120B) protrude to an opposing direction, respectively, and the insertion grooves (241c, 242c, 243c, 244c) are formed on rear surfaces of said coupling portions (241, 242, 243, 244).

4. The heat exchange-condensation panel assembly according to claim 2, wherein the coupling portions (145, 146) of the respective panels (110A, 110B) of the panel assembly (110) of the moisture air flow passage are provided with fixing protrusions (145a, 146a) each of which protrudes outwardly, respectively, and fixing grooves (146b, 145b) into which the fixing protrusions of another panel are inserted, respectively, are formed on the rear surfaces of the fixing protrusions;

the coupling portions (245, 246) of the respective panels (120A, 120B) of the panel assembly (120) of the cooling water flow passage are provided with fixing protrusions (245a, 246a) each of which protrudes outwardly, respectively, and fixing grooves (246b, 245b) into which the fixing protrusions of another panel are inserted, respectively, are formed on the rear surfaces of the fixing protrusions;

the fixing protrusions (141a, 143a) which protrude outwardly on the coupling portions (141, 143), respectively, of one panel (110B) of the panel assembly (110) are inserted into the fixing grooves (242b, 244b) formed on rear surfaces of the fixing protrusions (242a, 244a) which protrude outwardly on the coupling portions (242, 244), respectively, of one panel (120A) of the panel assembly (120); and the fixing protrusions (241a, 243a) which protrude outwardly on the coupling portions (241, 243), respectively, of one panel (120A) of the panel assembly (120) are inserted into the fixing grooves (142b, 144b) formed on rear surfaces of the fixing protrusions (142a, 144a) which protrude outwardly on the coupling portions (142, 144), respectively, of one panel (110B) of the panel assembly (110).

5. The heat exchange-condensation panel assembly according to claim 1, wherein a space portion (135) is formed on an inside of the protruding portion (118) of the panels(110A, 110B) of the panel assembly (100), to be communicated with the recessed surface of the conduit elements(110a, 110b), and a space portion (235) is formed on an inside of the protruding portion (218) of the panels (120A, 120B) of the panel assembly (120), to be communicated with the recessed surface of the conduit elements (120a, 120b).

6. The heat exchange-condensation panel assembly according to claim 5, wherein a side end of the space portion (135) formed on the inside of the protruding portion (118) of the panels(110A, 110B) of the panel assembly (100) opened to be communicated with the space portion (135) of the protruding portion (118) to be coupled, and a side end of the space portion (235) formed on the inside of the protruding portion (218) of the panels (120A, 120B) of the panel assembly (120) opened to be communicated with the space portion (235) of the protruding portion (218) to be coupled.

7. A plume abatement and evaporated water recovery apparatus which is arranged on a discharging passage of a gas containing vapor (moisture air) and is provided with a plurality of moisture air flow passages through which moisture air flows and a plurality of condensing air flow passages through which the condensing air (atmospheric air) flows so that water in the moisture air is condensed through cooling the moisture air by the condensing air, comprising:

a heat exchange-condensation panel assembly (100) provided with a plurality of moisture air flow passages (113), a plurality of cooling water flow passages (123) and a plurality of condensing air flow passages (133) wherein the moisture air flow passage (113) is arranged adjacently to the condensing air flow passage (133) so that the moisture air passing through the moisture air flow passage is condensed by the condensing air passing through the condensing air flow passage, and the cooling water flow passage (123) is arranged adjacently to the condensing air flow passage (133) so that the cooling water passing through the cooling water flow passage is cooled by the condensing air passing through the condensing air flow passage;

a first cooling water distribution means that is arranged on an upper part of the heat exchange-condensation panel assembly (100) and distributes a part of the cooling water to be cooled to an inlet of the cooling water flow passage (123) of the heat exchange-condensation panel assembly (100);

a filler (33) that is arranged on a lower part of the heat exchange-condensation panel assembly (100) and heat-exchanges the cooling water with the air introduced into a cooling air inlet (32); and a second cooling water distribution means that is arranged between a lower part of the heat exchange-condensation panel assembly (100) and an upper part of the filler (33), and distributes the remaining cooling water over the filler except for the cooling water distributed by the first cooling water distribution means among the cooling water to be cooled.

8. The plume abatement and evaporated water recovery apparatus according to claim 7, wherein the heat exchange-condensation panel assemblies (100) are arranged on both sides of the plume abatement and evaporated water recovery apparatus, respectively, to occupy about ⅔ of the internal area of the apparatus wherein a space portion is formed on an internal center thereof, about ⅔ of a total amount of cooling water to be cooled is distributed to the cooling water flow passage (123) of the heat exchange-condensation panel assembly (100) through the first cooling water distribution means, and about ⅓ of a total amount of cooling water to be cooled is distributed to the filler (33) through the second cooling water distribution means.

9. The plume abatement and evaporated water recovery apparatus according to claim 7, wherein an eliminator is arranged over the first cooling water distribution means.

10. The plume abatement and evaporated water recovery apparatus according to claim 9, wherein the eliminators are arranged to be inclined upwardly from both sides of the plume abatement and evaporated water recovery apparatus toward an upper center thereof.

11. The plume abatement and evaporated water recovery apparatus according to claim 9, wherein the first cooling water distribution means is provided with a plurality of hollow circular injection nozzles.

12. The plume abatement and evaporated water recovery apparatus according to claim 7, wherein the first cooling water distribution means distributes the cooling water to the moisture air flow passage (113) of the heat exchange-condensation panel assembly (100).

13. The plume abatement and evaporated water recovery apparatus according to claim 12, wherein the eliminators are arranged over the first cooling water distribution means to be inclined upwardly from both sides of the plume abatement and evaporated water recovery apparatus toward an upper center thereof.

14. The plume abatement and evaporated water recovery apparatus according to claim 7, wherein the heat exchange-condensation panel assembly (100) comprising:

a panel assembly (110) of the moisture air flow passage provided with a pair of panels (110A, 110B) wherein protruding portions (118) formed on inner surfaces of the panels, respectively, are adhered to each other to form the moisture air flow passage (113) therein, and a plurality of conduit elements (110a, 110b) each of which is recessed on outer surfaces of the pair of panels (110A, 110B) and a plurality of connecting portions (114), each of which protrudes outside, are provided in side-by-side parallel; and a panel assembly (120) of the cooling water flow passage provided with a pair of panels (120A, 120B) wherein protruding portions (218) formed on inner surfaces of the panels, respectively, are adhered to each other to form the cooling water flow passage (123) therein, and a plurality of conduit elements (120*a*, 120*b*) each of which is recessed on outer surfaces of the pair of panels (120A, 120B) and a plurality of connecting portions (214), each of which protrudes outside, are provided in side-by-side parallel, wherein a plurality of condensing air flow passages (133), each of which is in a conduit shape, are formed in side-by-side parallel by adhering together the connecting portions (114) of the panel assembly (110) of the moisture air flow passage and the connecting portions (214) of the panel assembly (120) of the cooling water flow passage in such a manner that the conduit elements (110*a*, 110*b*) of the panel assembly (110) of the moisture air flow passage are faced to the conduit elements (120*a*, 120*b*) of the panel assembly (120) of the cooling water flow passage.

15. The plume abatement and evaporated water recovery apparatus according to claim 14, wherein an eliminator is arranged over the first cooling water distribution means.

16. The plume abatement and evaporated water recovery apparatus according to claim 14, wherein the first cooling water distribution means distributes the cooling water to the moisture air flow passage (113) of the heat exchange-condensation panel assembly (100).

17. The plume abatement and evaporated water recovery apparatus according to claim 14, wherein the panel assembly (110) of the moisture air flow passage is provided with coupling portions (141, 142, 143, 144) each of which protrudes frontward or rearward, and insertion grooves (141*c*, 142*c*, 143*c*, 144*c*) on rear surfaces of the coupling portions, respectively so that the coupling portions of one panel are inserted into the coupling grooves of the other panel, respectively;

the panel assembly (120) of the cooling water flow passage is provided with coupling portions (241, 242, 243, 244) each of which protrudes frontward or rearward, and insertion grooves (241*c*, 242*c*, 243*c*, 244*c*) on rear surfaces of the coupling portions, respectively so that the coupling portions of one panel are inserted into the coupling grooves of the other panel, respectively; and the coupling portions (141, 143) of one panel (110B) of the panel assembly (110) of the moisture air flow passage are inserted into the insertion grooves (242*c*, 244*c*) of one panel (120A) of the panel assembly (120) of the cooling water flow passage, respectively, and the coupling portions (241, 243) of one panel (120A) of the panel assembly (120) of the cooling water flow passage are inserted into the insertion grooves (142*c*, 144*c*) of one panel (110B) of the panel assembly (110) of the moisture air flow passage, respectively.

* * * * *